US010815346B2

(12) United States Patent
Nii et al.

(10) Patent No.: US 10,815,346 B2
(45) Date of Patent: Oct. 27, 2020

(54) WATER SOLUBLE FILM, PACKETS EMPLOYING THE FILM, AND METHODS OF MAKING AND USING SAME

(71) Applicant: MONOSOL, LLC, Merrillville, IN (US)

(72) Inventors: Shinsuke Nii, Merrillville, IN (US); David M. Lee, Crown Point, IN (US); Jennifer L. Childers, Lowell, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 15/011,201

(22) Filed: Jan. 29, 2016

(65) Prior Publication Data

US 2016/0280869 A1  Sep. 29, 2016

Related U.S. Application Data

(60) Provisional application No. 62/139,478, filed on Mar. 27, 2015.

(51) Int. Cl.
| | |
|---|---|
| *C11D 17/04* | (2006.01) |
| *B65D 65/46* | (2006.01) |
| *C08J 5/18* | (2006.01) |
| *C08K 5/00* | (2006.01) |
| *C08K 5/053* | (2006.01) |

(52) U.S. Cl.
CPC .............. *C08J 5/18* (2013.01); *C08K 5/0016* (2013.01); *C11D 17/043* (2013.01); *C08J 2329/04* (2013.01); *C08K 5/053* (2013.01)

(58) Field of Classification Search
None
See application file for complete search history.

(56) References Cited

U.S. PATENT DOCUMENTS

| | | | |
|---|---|---|---|
| 2,220,099 A | 11/1940 | Guenther et al. | |
| 2,477,383 A | 7/1949 | Lewis | |
| 3,607,812 A | 9/1971 | Takigawa et al. | |
| 3,664,961 A | 5/1972 | Norris | |
| 3,919,678 A | 11/1975 | Penfold | |
| 3,929,678 A | 12/1975 | Laughlin et al. | |
| 3,975,280 A | 8/1976 | Hachmann et al. | |
| 4,000,093 A | 12/1976 | Nicol et al. | |
| 4,075,116 A | 2/1978 | Mesaros | |
| 4,222,905 A | 9/1980 | Cockrell, Jr. | |
| 4,239,659 A | 12/1980 | Murphy | |
| 4,246,612 A | 1/1981 | Berry et al. | |
| 4,259,217 A | 3/1981 | Murphy | |
| 4,747,976 A | 5/1988 | Yang et al. | |
| 4,810,410 A | 3/1989 | Diakun et al. | |
| 4,885,105 A * | 12/1989 | Yang ......................... | C11D 3/02 206/524.3 |
| 5,114,611 A | 5/1992 | Van Kralingen et al. | |
| 5,137,646 A | 8/1992 | Schmidt et al. | |
| 5,227,084 A | 7/1993 | Martens et al. | |
| 5,340,496 A | 8/1994 | Sato et al. | |
| 5,342,876 A * | 8/1994 | Abe ......................... | A61K 8/25 264/15 |
| RE34,988 E | 7/1995 | Yang et al. | |
| 5,576,281 A | 11/1996 | Bunch et al. | |
| 6,599,871 B2 | 7/2003 | Smith | |
| 6,787,512 B1 * | 9/2004 | Verrall ................. | C11D 17/043 428/35.2 |
| 7,022,656 B2 | 4/2006 | Verrall et al. | |
| 7,754,318 B2 | 7/2010 | Kitamura et al. | |
| 2003/0060390 A1 | 3/2003 | Demeyere et al. | |
| 2003/0126282 A1 | 7/2003 | Sarkar et al. | |
| 2003/0139312 A1 | 7/2003 | Caswell et al. | |
| 2004/0092635 A1 * | 5/2004 | Kitamura ................... | C08J 5/18 524/386 |
| 2004/0204337 A1 | 10/2004 | Corona et al. | |
| 2005/0010010 A1 | 1/2005 | Kitamura et al. | |
| 2007/0034575 A1 * | 2/2007 | Tufano .................... | C02F 1/722 210/759 |
| 2007/0219111 A1 | 9/2007 | Ward et al. | |
| 2008/0146481 A1 * | 6/2008 | Brown ................. | C11D 17/042 510/224 |
| 2009/0291282 A1 * | 11/2009 | Kitamura ................... | C08J 5/18 428/220 |
| 2011/0186467 A1 * | 8/2011 | Denome ................. | B65D 65/46 206/524.7 |
| 2011/0189413 A1 * | 8/2011 | Denome ................. | B65D 65/46 428/35.4 |

(Continued)

FOREIGN PATENT DOCUMENTS

| | | |
|---|---|---|
| EP | 0 197 434 B1 | 7/1989 |
| EP | 0414 549 A2 | 2/1991 |

(Continued)

OTHER PUBLICATIONS

Smith, The effects of antiblocking agents on the performance of polymer process aids, DuPont Performance Elastomers L.L.C. (Sep. 16, 2006).

Russian Patent Application No. 2017134647, Search Report, dated May 17, 2019.

Russian Patent Application No. 2017134647, Office Action, dated May 21, 2019.

Australian Patent Application No. 2016243825, Examination Report No. 1, dated Sep. 26, 2019.

(Continued)

*Primary Examiner* — Lorna M Douyon

(74) *Attorney, Agent, or Firm* — Marshall, Gerstein & Borun LLP

(57) ABSTRACT

A water-soluble film including a polyvinyl alcohol copolymer resin, a plasticizer, an anti-block filler, and a release modifier is disclosed herein. Also disclosed are related packets incorporating the film, and related methods of making and using the film and packets.

24 Claims, 10 Drawing Sheets

(56) References Cited

U.S. PATENT DOCUMENTS

| | | | | |
|---|---|---|---|---|
| 2013/0206638 A1* | 8/2013 | Wong | ............... | C11D 3/046 206/524.7 |
| 2013/0244920 A1* | 9/2013 | Lee | ............... | C11D 3/2093 510/392 |
| 2013/0273277 A1 | 10/2013 | Lee et al. | | |
| 2014/0162929 A1 | 6/2014 | Labeque et al. | | |
| 2014/0199460 A1 | 7/2014 | Lee et al. | | |
| 2016/0102278 A1* | 4/2016 | Labeque | ............... | C11D 17/042 510/296 |
| 2017/0259975 A1* | 9/2017 | Yonezawa | ............... | B65D 65/02 |

FOREIGN PATENT DOCUMENTS

| | | |
|---|---|---|
| EP | 2258820 A1 | 12/2010 |
| EP | 1418196 | 8/2011 |
| GB | 1 137 741 A | 12/1968 |
| GB | 1 466 799 A | 3/1977 |
| JP | H04288353 A | 10/1992 |
| JP | H06507193 A | 8/1994 |
| JP | 4611157 | 10/2010 |
| WO | WO-92/16583 A1 | 10/1992 |
| WO | WO-93/08874 A1 | 5/1993 |
| WO | WO-93/08876 A1 | 5/1993 |
| WO | WO-94/22800 A1 | 10/1994 |
| WO | WO-2006/078897 A1 | 7/2006 |
| WO | WO-2009/152031 A1 | 12/2009 |
| WO | WO-2014/151718 A2 | 9/2014 |
| WO | WO-2016/061054 A1 | 4/2016 |

OTHER PUBLICATIONS

International Application No. PCT/US2016/015768, International Search Report and Written Opinion, dated Sep. 15, 2016.

* cited by examiner

WATER SOLUBLE FILM, PACKETS EMPLOYING THE FILM, AND METHODS OF MAKING AND USING SAME

CROSS-REFERENCE TO RELATED APPLICATION

The benefit under 35 U.S.C. § 119(e) of U.S. Provisional Patent Application No. 62/139,478 filed Mar. 27, 2015, is hereby claimed, and the disclosure thereof is hereby incorporated by reference herein.

BACKGROUND

Field of the Disclosure

The disclosure relates generally to water-soluble films. More particularly, the disclosure relates to polyvinyl alcohol based water-soluble films useful for packaging ingredients and releasing them into cold water after a desired amount of time.

Brief Description of Related Technology

Water-soluble polymeric films are commonly used as packaging materials to simplify dispersing, pouring, dissolving and dosing of a material to be delivered. For example, pouches made from water-soluble film are commonly used to package household care compositions such as laundry or dish detergent. A consumer can directly add the pouched composition to a mixing vessel, such as a bucket, sink or washing machine. Advantageously, this provides for accurate dosing while eliminating the need for the consumer to measure the composition. The pouched composition may also reduce mess that would be associated with dispensing a similar composition from a vessel, such as pouring a liquid laundry detergent from a bottle. In sum, soluble pre-measured polymeric film pouches provide for convenience of consumer use in a variety of applications.

Some water-soluble polymeric films that are used to make currently marketed pouches may incompletely dissolve during the wash cycle, leaving film residue on items within the wash. Such problems may particularly arise when the pouch is used under stressed wash conditions, such as when the pouch is used in cold water, i.e. water at as low as 5° C. Notably, environmental concerns and energy cost are driving consumer desire for utilizing colder wash water.

More recently, the COMMISSION REGULATION (EU) No. 1297/2014 of 5 Dec. 2014 amended, for the purposes of its adaptation to technical and scientific progress, Regulation (EC) No. 1272/2008 of the European Parliament and of the Council on classification, labelling and packaging of substances and mixtures to require additional provisions for liquid consumer laundry detergent in dosages for single use contained in a soluble packaging. Among those provisions were the requirements that the soluble packaging shall retain its liquid content for at least 30 seconds when the soluble packaging is placed in water at 20° C.

Thus, there exists a need in the art for a water soluble film that is cold water soluble, that can be formed into packages for holding liquid detergents, and that when formed into packages will retain its liquid content for at least 30 seconds when the soluble packaging is placed in water at 20° C.

SUMMARY

A first aspect of the disclosure herein is a water-soluble film comprising a mixture of a water-soluble polyvinyl alcohol and a plasticizer blend comprising or consisting essentially of glycerol, sorbitol, and 2-methyl-1,3-propanediol.

Another aspect of the disclosure herein is a water-soluble film comprising or consisting essentially of a mixture of a water-soluble polyvinyl alcohol and a plasticizer blend comprising glycerol, sorbitol, and trimethylolpropane.

Still another aspect of the disclosure herein is water-soluble film comprising a mixture of a water-soluble polyvinyl alcohol, a plasticizer, an anti-block filler, and a release modifier.

Further aspects of the disclosure herein are articles, including containers, made from or with any one of the films described herein, and such containers filled with compositions, e.g. detergent actives.

Other aspects of the disclosure herein are methods of making such films and containers.

Still further aspects of the disclosure herein are methods of using such films and containers, e.g. for dispensing compositions held by a film when contacted with water, e.g. as a laundry detergent pouch.

For the films, related articles, and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description, taken in conjunction with the drawings. While the film, pouch, and their methods of making are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, sixteen drawing figures are appended hereto.

DETAILED DESCRIPTION

Definitions

Figure 1:
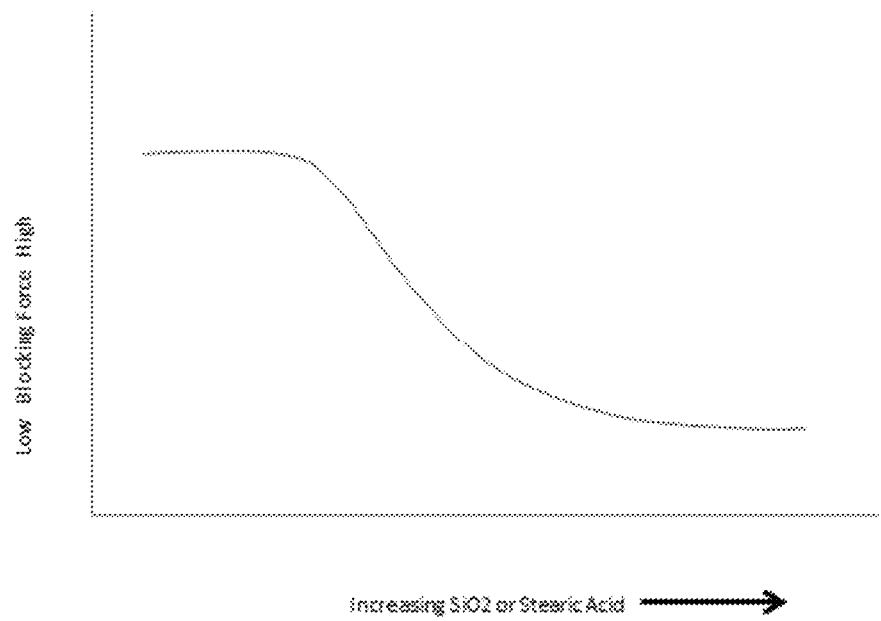
FIG. 1 illustrates the contemplated trend in the decrease in blocking force with additional levels of anti-blocking filler and release modifier in films according to the disclosure herein.

"Comprising" as used herein means that various components, ingredients or steps can that be conjointly employed in practicing the present disclosure. Accordingly, the term "comprising" encompasses the more restrictive terms "consisting essentially of" and "consisting of". The present compositions can comprise, consist essentially of, or consist of any of the required and optional elements disclosed herein.

"Liquid" as used herein includes pastes, liquids, gels, foams and mousse. Non-limiting examples of liquids include: light duty and heavy duty liquid detergent compositions, fabric enhancers, hard surface cleaning compositions, detergent gels commonly used for laundry and dishwashing, bleach and laundry additives, shampoos, body washes, and other personal care compositions. Gases (e.g., suspended bubbles or solids, e.g., particles) can be included within the liquid. Light duty and heavy duty liquid detergent compositions, e.g. for laundry care, are particularly contemplated.

All percentages, parts and ratios are based upon the total dry weight of the film composition or total weight of the packet content composition of the present disclosure and all measurements made are at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

The pouches described herein comprise a water-soluble film. The water-soluble film, pouches comprising the water-soluble film, compositions contained with the pouches (i.e., "pouch compositions"), packaging for the pouches and processes of washing utilizing a pouch are described herein below.

As used herein, the terms packet(s) and pouch(es) should be considered interchangeable. In certain embodiments, the terms packet(s) and pouch(es), respectively, are used to refer to a container made using the film and a sealed container preferably having a material sealed therein, e.g., in the form a measured dose delivery system. The sealed pouches can be made from any suitable method, including such processes and features such as heat sealing, solvent welding, and adhesive sealing (e.g., with use of a water-soluble adhesive).

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "PHR" is intended to refer to the composition of the identified element in parts per one hundred parts water-soluble polymer (or resin; whether PVOH or otherwise) in the water-soluble film.

As described below, the film described herein surprisingly provides a combination of (1) acceptable liquid release characteristics when used for preparing pouches containing liquid ingredients, as measured by the Liquid Release Test described below; (2) superior low residue performance as characterized by the Dissolution Chamber Test; and (3) excellent ability to be converted into a pouch using automated equipment (convertibility) as characterized by a relatively low coefficient of friction (COF), as measured by the Coefficient of Friction Test described below.

The film includes a water-soluble polyvinyl alcohol (PVOH) copolymer resin, a plasticizer, a release modifier, an anti-block filler, and optional ingredients.

The film can be made by a solution casting method. The film can be used to form a container (pouch) by any suitable process, including thermoforming and, for example, solvent sealing or heat sealing of film layers around a periphery of the container. The pouches can be used for dosing materials to be delivered into bulk water, for example.

The film, pouches, and related methods of making and use are contemplated to include embodiments including any combination of one or more of the additional optional elements, features, and steps further described below (including those shown in the Examples and figures), unless stated otherwise.

Water-Soluble Film

The film and related pouches described herein comprise a plasticized, solution-cast, water-soluble film. In one aspect, the water-soluble film comprises a total of at least about 50 wt % of a PVOH resin comprising one or more PVOH polymers that optionally includes a PVOH copolymer. The film can have any suitable thickness, and a film thickness of about 76 microns (μm) is typical and particularly contemplated. Other values and ranges contemplated include values in a range of about 5 to about 200 μm, or in a range of about 20 to about 100 μm, or about 40 to about 90 μm, or about 50 to 80 μm, or about or about 60 to 65 μm for example 65 μm, 76 μm, or 88 μm.

PVOH Resin

The film described herein includes one or more polyvinyl alcohol (PVOH) polymers to make up the PVOH resin content of the film, and can include a PVOH copolymer resin.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

In particular, the PVOH resin will include a partially or fully hydrolyzed PVOH copolymer that includes an anionic monomer unit, a vinyl alcohol monomer unit, and optionally a vinyl acetate monomer unit. In various embodiments, the anionic monomer can be one or more of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). For example, the anionic monomer can include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid) and alkali metal salts thereof (e.g., sodium salts). Similarly, the anionic monomer can include one or more of monomethyl maleate and alkali metal salts thereof (e.g., sodium salts).

In one type of embodiment, the PVOH is a carboxyl group modified copolymer. In another aspect, the PVOH can be modified with a dicarboxyl type monomer. In one class of these embodiments, the α carbon of the carbonyl is contacted to the unsaturated bond (e.g., maleic acid, fumaric acid). In another class of these embodiments, the α carbon of the carbonyl is contacted to the unsaturated bond with a methyl branch (e.g., citraconic acid, mesaconic acid). In another class of these embodiments, the β carbon of the carbonyl is contacted to the unsaturated bond (e.g. itaconic acid, glutaconic acid cis, glutaconic acid trans). Monomers that provide alkyl carboxyl groups are contemplated. A maleate type (e.g., dialkyl maleate, including monomethyl maleate) comonomer is particularly contemplated.

The amount of inclusion of the anionic functional groups in the PVOH resin can be in a range of 1 to 10 mole %, or 1.5% to 8%, or 2 to 6%, or 1% to 4%, for example, 2%, 3%, 4%, 5%, 6%, 7%, or 8%.

In another aspect the number of pendant groups introduced by copolymerization can be in a range of 1% to 20%, or 1.5% to 8%, or 2% to 12%, or 2% to 10%, or at least 2.5%, or at least 3%, or at least 3.5%, for example 2%, 3%, 6%, or 8%.

The amount of PVOH copolymers in the film can be in a range of about 55 to about 95% by weight based on the total weight of the film, or about 60% to 90%, or about 65% to about 85%. If two liquid plasticizers are used, a range of about 75% to about 80% PVOH copolymers is particularly contemplated, for example 76%, 77%, or 78%. If two solid plasticizers are used, a range of about 65% to about 75% PVOH copolymers is particularly contemplated, for example 67%, 68%, 69%, 70%, 71%, or 72%.

The total PVOH resin content of the film can have a degree of hydrolysis (D.H. or DH) of at least 80%, 84% or 85% and at most about 99.7%, 98%, 96%, or 80%, for example in a range of about 84% to about 90%, or 85% to 88%, or 86.5%, or in a range of 85% to 99.7%, about 88% to 98%, or 90% to 96%, for example 91%, 92%, 93%, 94%, 95%, or 96%. As used herein, the degree of hydrolysis is expressed as a mole percentage of vinyl acetate units converted to vinyl alcohol units.

Viscosity

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

The PVOH resin can have a viscosity average of at least about 10 cP, 12 cP, 13 cP, 13.5 cP, 14 cP, 15 cP, 16 cP, or 17 cP and at most about 30 cP, 28 cP, 27 cP, 26 cP, 24 cP, 22 cP, 20 cP, 19 cP, 18 cP, or 17.5 cP, for example in a range of about 13 cP to about 27 cP, or about 13.5 cP to about 20 cP, or about 18 cP to about 22 cP, or about 14 cP to about 19 cP, or about 16 cP to about 18 cP, or about 17 cP to about 16 cP, for example 23 cP, or 20 cP, or 16.5 cP. It is well known in the art that the viscosity of PVOH resins is correlated with the weight average molecular weight ($\overline{M}w$) of the PVOH resin, and often the viscosity is used as a proxy for the $\overline{M}w$.

Other Water Soluble Polymers

Other water soluble polymers for use in addition to the PVOH copolymer film can include, but are not limited to a vinyl alcohol-vinyl acetate copolymer, sometimes referred to as a PVOH homopolymer, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH or otherwise are commercially available from a variety of sources.

Plasticizers

The plasticizer can include, but is not limited to, glycerol, diglycerol, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (e.g. MP Diol®), ethanolamines, and a mixture thereof. The plasticizer can be selected from glycerol, sorbitol, triethyleneglycol, propylene glycol, diproyplene glycol, 2-methyl-1,3-propanediol, trimethylolpropane, or a combination thereof. In one type of embodiment, the plasticizer includes glycerol, sorbitol, and 2-methyl-1,3-propanediol. In another type of embodiment, the plasticizer includes glycerol, sorbitol, and trimethylolpropane. The total amount of the plasticizer can be in a range of about 10 wt. % to about 45 wt. %, or about 20 wt. % to about 45 wt. %, or about 15 wt. % to about 35 wt. %, or about 20 wt. % to about 30 wt. %, for example about 25 wt. %, based on total film weight.

For example, with a combination of glycerol, sorbitol, and 2-methyl-1,3-propanediol, the total amount of plasticizer can be in a range of about 10 wt. % to about 40 wt. %, or about 15 wt. % to about 45 wt. %, or about 20 wt. % to about 30 wt. %, or about 22 wt. % to about 28 wt. %, e.g. 25 wt. %. These ranges are generally lower because two of the plasticizers (glycerol and 2-methyl-1,3-propanediol) are liquids at room temperature and one (sorbitol) is a solid at room temperature. Optionally, glycerol can be used in an amount of about 2 wt % to about 25 wt %, or 3 wt % to about 20 wt %, or about 4 wt. % to about 14 wt. %, or about 6 wt. % to about 12 wt. % e.g., about 9 wt %. Optionally, sorbitol can be used in an amount of about 0.1 wt % to about 20 wt %, or about 0.5 wt. % to about 15 wt %, or about 1 wt. % to about 10 wt. %, or about 2 wt. % to about 6 wt. %, e.g., about 3.3 wt %. Optionally, 2-methyl-1,3-propanediol can be used in an amount of about 5 wt. % to about 30 wt. %, or about 10 wt. % to about 22.5 wt. %, or about 12 wt. % to about 18 wt. %, for example 16 wt. %.

In another aspect, the amount of plasticizers can be characterized in PHR. Thus, for example, with a combination of glycerol, sorbitol, and 2-methyl-1,3-propanediol (MPD), the total amount of plasticizer can be at least 20 PHR, or at least 25 PHR, for example. The total amount of plasticizer can be up to 40 PHR or 45 PHR, for example. The total amount of plasticizer can be in a range of 20-40 PHR, or 25-40 PHR, or 25-35 PHR, or 25-30 PHR, for example. The total amount of plasticizer can be 30 PHR.

In one type of embodiment, the individual components can be characterized by 6.0 PHR<glycerol<13.5 PHR; 1.0 PHR<sorbitol<5.0 PHR and 10.0 PHR<MPD<15.0 PHR, and optionally where the total amount of plasticizers is 20 PHR or at least 20 PHR. Embodiments having these characteristics and 20 PHR total plasticizer can exhibit a preferred range of physical characteristics, including: (1) modulus at 10%<80 N/mm$^2$; (2) DC (5 min) residue<35 wt. %; (3) Tear Strength>1000 g/mil; (4) Tensile Strength>35 MPa; (5) Corrected Dissolution Time$_{3\ mil}$<80 seconds; and (6) Static COF<1.

In another type of embodiment, the individual components can be characterized by 5.0 PHR<glycerol<11.3 PHR; 1.25 PHR<sorbitol<7.5 PHR and 12.5 PHR<MPD<18.8 PHR, and optionally where the total amount of plasticizers is 25 PHR or at least 25 PHR. Embodiments having these characteristics and 25 PHR total plasticizer can exhibit a preferred range of physical characteristics, including: (1) modulus at 10%<90 N/mm$^2$; (2) DC (5 min) residue<45 wt. %; (3) Tear Strength>1000 g/mil; (4) Tensile Strength>35 MPa; (5) Corrected Dissolution Time$_{3\ mil}$<90 seconds; and (6) Static COF<1.

In another type of embodiment, the individual components can be characterized by 6.0 PHR<glycerol<13.5 PHR; 1.5 PHR<sorbitol<9.0 PHR; and 15 PHR<MPD<22.5 PHR, and optionally where the total amount of plasticizers is 30 PHR or at least 30 PHR. Embodiments having these characteristics and 30 PHR total plasticizer can exhibit a preferred range of physical characteristics, including: (1) modulus at 10%<80 N/mm$^2$; (2) DC (5 min) residue<35 wt. %; (3) Tear Strength>1000 g/mil; (4) Tensile Strength>35 MPa; (5) Corrected Dissolution Time$_{3\ mil}$<80 seconds; and (6) Static COF<1.

In another type of embodiment, the individual components can be characterized by 7.6 PHR<glycerol<11.8 PHR; 2.2 PHR<sorbitol<7.3 PHR; and 15 PHR<MPD<18.5 PHR, and optionally where the total amount of plasticizers is 30 PHR or at least 30 PHR. Embodiments having these characteristics and 30 PHR total plasticizer can exhibit a preferred range of physical characteristics, including: (1) modulus at 10%<80 N/mm$^2$; (2) DC (5 min) residue<35 wt. %; (3) Tear Strength>1700 g/mil; (4) Tensile Strength>35 MPa; (5) Corrected Dissolution Time$_{3\ mil}$<80 seconds; and (6) Static COF<1.

Thus, in another contemplated embodiment, the film includes a plasticizer blend including glycerol, sorbitol, and 2-methyl-1,3-propanediol as described herein, and a maleate polyvinyl alcohol copolymer having a carboxyl pendant group modification degree in a range of 6 mol % to 10 mol %, or 7 mol % to 9 mol %, and a viscosity in a range of 10.5 cP to 22.5 cP, or 12.5 cP to about 22.5 cP, or 15.0 cP to about 20.0 cP, and a degree of hydrolysis in a range of about 80% to 99% or 85% to 95%, for example consistent with PVOH-6 described herein. This type of film showed a favorable combination of DC (5 min) residue and Corrected Dissolution Time characteristics. See Example 2 below.

The film can include a plasticizer blend including glycerol, sorbitol, and 2-methyl-1,3-propanediol as described herein, and a methyl acrylate polyvinyl alcohol copolymer resin having a degree of modification of about 4.0 to about 6.0, or about 4.5 to 5.5, and a viscosity of about 10 cP to 30 cP, or about 15 cP to about 25 cP, or about 17 cP to about 23 cP, and a degree of hydrolysis of about 98 to about 99.8, or 99 to about 99.8, for example consistent with PVOH-4 described herein. This type of film showed a favorable combination of DC (5 min) residue and Corrected Dissolution Time characteristics. See Example 2 below.

In another example, within a combination of glycerol, sorbitol, and trimethylolpropane, the total amount of plasticizer can be in a range of about 25 wt. % to about 50 wt. %, or about 30 wt. % to about 45 wt. %, or about 35 wt. % to about 45 wt. %, or about 40 wt. % to about 45 wt. %, for example 42 wt. %. These ranges are generally higher because two of the plasticizers (sorbitol and TMP) are solids at room temperature and one (glycerol) is a liquid. Optionally, glycerol can be used in an amount of about 5 wt % to about 40 wt %, or 10 wt % to about 35 wt %, or about 15 wt. % to about 30 wt. %, e.g., about 20 wt. %. Optionally, sorbitol can be used in an amount of about 1 wt. % to about 20 wt. %, or about 3 wt. % to about 20 wt. %, or about 5 wt. % to about 15 wt. % for example 10 wt. %. Optionally, trimethylolpropane can be used in an amount of about 1 wt % to about 25 wt %, or about 2 wt % to about 20 wt %, or about 5 wt. % to about 15 wt. %, e.g., about 10 wt. %.

In another aspect, the amount of plasticizers can be characterized in PHR. Thus, for example, with a combination of glycerol, sorbitol, and trimethylolpropane (TMP), the total amount of plasticizer can be at least 30 PHR, or at least 35 PHR, for example. The total amount of plasticizer can be up to 40 PHR or 45 PHR or 50 PHR, for example. The total amount of plasticizer can be in a range of 30-50 PHR, about 32.5 PH to about 42.5 PHR, or 35-45 PHR, or 35-40 PHR, or greater than 30 PHR and less than 45 PHR, or 40 PHR to 50 PHR, for example. The total amount of plasticizer can be 37.5 PHR.

In one type of embodiment, the individual components can be characterized by 19.5 PHR<glycerol<22.5 PHR; 6.7 PHR<sorbitol<11.7 PHR and 6.3 PHR<TMP<9.5 PHR, and optionally where the total amount of plasticizers is 37.5 PHR or at least 37.5 PHR. Embodiments having these characteristics and 37.5 PHR total plasticizer can exhibit a preferred range of physical characteristics, including: (1) modulus at 10%<30 N/mm$^2$; (2) DC (5 min) residue<50 wt. %; (3) Tear Strength>1000 g/mil; (4) Tensile Strength>35 MPa; (5) Corrected Dissolution Time$_{3\ mil}$<100 seconds; and (6) Static COF<1.

In another type of embodiment, the individual components can be characterized by 19.5 PHR<glycerol<22.5 PHR; 7.6 PHR<sorbitol<11.7 PHR; and 6.3 PHR<TMP<7.5 PHR, and optionally where the total amount of plasticizers is 37.5 PHR or at least 37.5 PHR. Embodiments having these characteristics and 37.5 PHR total plasticizer can exhibit a preferred range of physical characteristics, including: (1) modulus at 10%<30 N/mm$^2$; (2) DC (5 min) residue<50 wt. %; (3) Tear Strength>1000 g/mil; (4) Tensile Strength>35 MPa; (5) Corrected Dissolution Time$_{3\ mil}$<95 seconds; and (6) Static COF<1.

In another type of embodiment, the individual components can be characterized by 22.5 PHR<glycerol<23.3 PHR; 10.3 PHR<sorbitol<15 PHR; and 7.5 PHR<TMP<10.2 PHR, and optionally where the total amount of plasticizers is 45 PHR or at 40-50 PHR. Embodiments having these characteristics and 45 PHR total plasticizer can exhibit a preferred range of physical characteristics, including: (1) modulus at 10%<30 N/mm$^2$; (2) DC (5 min) residue<50 wt. %; (3) Tear Strength>1000 g/mil; (4) Tensile Strength>35 MPa; (5) Corrected Dissolution Time$_{3\ mil}$<100 seconds; and (6) Static COF<1.

In another type of embodiment, the individual components can be characterized by 22.5 PHR<glycerol<23.3 PHR; 13.0 PHR<sorbitol<15 PHR; and 7.5 PHR<TMP<9.0 PHR, and optionally where the total amount of plasticizers is 45 PHR or at 40-50 PHR. Embodiments having these characteristics and 45 PHR total plasticizer can exhibit a preferred range of physical characteristics, including: (1) modulus at 10%<30 N/mm$^2$; (2) DC (5 min) residue<50 wt. %; (3) Tear Strength>1000 g/mil; (4) Tensile Strength>35 MPa; (5) Corrected Dissolution Time$_{3\ mil}$<95 seconds; and (6) Static COF<1.

Plasticizer levels consistent with those of the examples described herein are specifically contemplated both as representative levels for film formulations with various of the other ingredients described herein, and as various upper and lower bounds for ranges. The specific amounts of plasticizers can be selected in a particular embodiment based on factors described herein, including desired film flexibility and conversion features of the water-soluble film. At low plasticizer levels, films may become brittle, difficult to process, or prone to breaking. At elevated plasticizer levels, films may be too soft, weak, or difficult to process for a desired use.

A plasticizer is a liquid, solid, or semi-solid that is added to a material (usually a resin or elastomer) making that material softer, more flexible (by decreasing the glass-transition temperature of the polymer), and easier to process. A polymer can alternatively be internally plasticized by chemically modifying the polymer or monomer. In addition or in the alternative, a polymer can be externally plasticized by the addition of a suitable plasticizing agent. The combination of plasticizers for the film described herein includes glycerol as a first plasticizer, a sugar alcohol as a second plasticizer, and a polyol as a third plasticizer which is different from the first plasticizer and the second plasticizer. In one type of embodiment, the water-soluble film will be substantially free from plasticizers other than the than the first, second, and third plasticizers (e.g., completely free from other plasticizers, or less than about 1 PHR of other plasticizers, or less than about 0.5 PHR of other plasticizers, or less than about 0.2 PHR of other plasticizers). In other embodiments, the water-soluble film can include further plasticizers (e.g., sugar alcohols, polyols, or otherwise) other than the first, second, and third plasticizers. The sugar alcohol plasticizer can be isomalt, maltitol, sorbitol, xylitol, erythritol, adonitol, dulcitol, pentaerythritol, or mannitol, for example. In a particular aspect, the sugar alcohol plasticizer can be sorbitol or a sorbitol-containing plasticizer such as isomalt. The polyol plasticizer can be, diglycerol, ethylene glycol, diethylene glycol, dipropylene glycol, triethyleneglycol, tetraethylene glycol, a polyethylene glycol up to 400 MW, neopentyl glycol, propylene glycol, 1,3-propanediol, 2-methyl-1,3-propanediol, trimethylolpropane, or a polyether polyol, for example. In a particular aspect, the polyol plasticizer can be propylene glycol, or 1,3 propanediol, 2-methyl-1,3-propanediol, for example trimethylol propane. In one class of embodiments, the water-soluble film includes the polyvinyl alcohol (PVOH) polymer and a plasticizer blend including glycerol as the first plasticizer, sorbitol as the second plasticizer, and 2-methyl-1,3-propanediol as the third plasticizer.

In some embodiments, the water-soluble film can include at least one plasticizer (e.g., as the second plasticizer, the third plasticizer, or otherwise) which is generally solid at room temperature and/or common use, storage, or transportation temperatures, for example a plasticizer which is solid in a range of about 10° C. or 20° C. to about 30° C., 40° C., or 50° C. and/or has a melting point above such range (e.g., a melting point below common film-formation process temperature such as casting, but above common use, storage, or transportation temperatures). Examples of such solid plasticizers include sorbitol (95° C. melting point) and trimethylolpropane (58° C. melting point). Additionally or alternatively, the water-soluble film can include at least one plasticizer (e.g., as the second plasticizer, the third plasticizer, or otherwise) which is generally liquid at room temperature and/or common use, storage, or transportation temperatures, for example which is liquid in a range of about 10° C. or 20° C. to about 30° C., 40° C., or 50° C. and/or has a melting point below such range.

Anti-Block Filler

SiO$_2$ helps to provide a low COF for convertibility, and optionally it aids in residue reduction.

As the concentration of anti-block filler (e.g. $SiO_2$) approaches 0 the tendency will be for the blocking force (that is the force to separate one film layer from the other on a roll) to increase. A minimum level of anti-block filler (e.g. $SiO_2$) is contemplated, and above a certain concentration there will be limited if any further reduction the blocking force provided by the anti-block filler (e.g. $SiO_2$). Put another way, the decrease in blocking force with additional levels will generally be "reverse S shaped" as illustrated in FIG. 1.

The anti-block filler (e.g. $SiO_2$) can be present in the film in an amount of at least 0.1 PHR, or at least 0.5 PHR, or at least 1 PHR, or in a range of about 0.1 to 3.0 PHR, or about 0.3 to about 2.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR. Without intending to be bound by any particular theory, it is believed that the reduction in blocking provided by 0.5 PHR anti-block filler (e.g. $SiO_2$) will not be linear—for example the decrease in blocking from 0.5 to 1.0 will be a greater decrease than the decrease from 1.0 to 1.5. It is easy to see that at some point if the anti-block filler (e.g. $SiO_2$) level gets high enough there will not be enough PVOH resin to bind the particles together. At such a high level it is easy to see that the film will release its contents very quickly upon even limited exposure to water. Long before the loading level reaches that point, the tensile properties of the resulting film will decline to unacceptable levels for its use as a packaging film. Higher concentrations of the anti-block filler (e.g. $SiO_2$) will, at a point, increase the tendency for the film to dissolve, rather than serving primarily or solely as an anti-block agent. In contrast to the release modifier (e.g., stearic acid) as described below, there is no reason to expect the anti-block filler (e.g. $SiO_2$) to migrate to the surface of the film. Therefore, the addition of the anti-block filler (e.g. $SiO_2$) could, at higher concentrations, also provide a favorable benefit in the residue reduction in the laundry process, but may also have an unfavorable effect on the Release Time when used as a pouch, as measured by the Liquid Release Test.

In addition to silicon dioxide/silica, calcium carbonate and talc are contemplated for use as anti-block/filler agents. A suitable median particle size for the anti-block/filler includes a median size in a range of about 3 or about 4 microns to about 11 microns, or about 4 to about 8 microns, or about 5 to about 6 microns, for example 5, 6, 7, 8, or 8 microns. A suitable $SiO_2$ is an untreated synthetic amorphous silica designed for use in aqueous systems. Additional agents known in the art for use in polyvinyl alcohol films as anti-block agents and fillers include starches, modified starches, crosslinked polyvinylpyrrolidone, crosslinked cellulose, microcrystalline cellulose, metallic oxides, and mica.

Release Modifier

Without intending to be bound by any particular theory, stearic acid is believed to work effectively as a release modifier for one or more of the following reasons: (a) it has a melting point below the boiling point of water that is used to create the casting solution of PVOH resin and additives; therefore acids with melting points below about 90° C. are particularly preferred; (b) it has a sufficiently long alkyl chain that it can effectively be a "waxy" substance that aids in reduction of blocking and reducing COF; (c) it has a sufficiently high melting point that is well above the typical higher temperatures that water soluble film see in transportation and storage, e.g. to the film converters to make pouches, and then from the film converters to consumers as end products (e.g. as much as 70° C. in extreme situations although more typically at most 50° C. or 40° C.; accordingly, acids with melting points above about 50° C. or above about 60° C. or above about 70° C. are contemplated. Thus, waxy acids having melting points in a range of about 50° C. to about 90° C., or about 60° C. to about 90° C., or about 70° C. to about 90° C., are contemplated.

Also contemplated are fatty acids, fatty acid esters, fatty acid amides, linear or branched versions of any of the foregoing, saturated or unsaturated versions of any of the foregoing, substituted or unsubstituted versions of any of the foregoing, particularly those with melting points above about 50° C. or above about 60° C. or above about 70° C. or in a range of about 50° C. to about 90° C., or about 60° C. to about 90° C., or about 70° C. to about 90° C., and combinations of any of the foregoing. Also contemplated are fatty acid salts having melting points above about 50° C. or above about 60° C. or above about 70° C. or in a range of about 50° C. to about 90° C., or about 60° C. to about 90° C., or about 70° C. to about 90° C., and combinations of any of the foregoing. Also contemplated are fatty amine acetates and fatty alcohols having melting points above about 50° C. or above about 60° C. or above about 70° C. or in a range of about 50° C. to about 90° C., or about 60° C. to about 90° C., or about 70° C. to about 90° C., and combinations of any of the foregoing, e.g. hydrogenated tallow amine acetate. Combinations of one or more release modifiers are contemplated for use in the film.

Particularly contemplated are one or more compounds selected from the group consisting of dodecanoic acid (MP 44° C.), tridecanoic acid (MP 45° C.), tetradecanoic acid (MP 54° C.), pentadecanoic acid (MP 43° C.), hexadecanoic acid (MP 63° C.), heptadecanoic acid (MP 63° C.), octadecanoic/stearic acid (MP 70° C.), nonadecanoic acid (MP 69° C.), eicosanoic acid (MP 77° C.), heneicosanoic acid (MP 82° C.), docosanoic acid (MP 81° C.), tricosanoic acid (MP 79° C.), tetracosanoic acid (MP 88° C.), pentacosanoic acid (MP 84° C.), hexacosanoic acid (MP 88° C.), heptacosanoic acid (MP 82° C.), octacosanoic acid (MP 90° C.), nonacosanoic acid (MP 90° C.), triacontanoic acid (MP 94° C.), eicosanoic acid methyl ester (MP 46° C.), heneicosanoic acid methyl ester (MP 49° C.), docosanoic acid methyl ester (MP 54° C.), tricosanoic acid methyl ester (MP 53° C.), tetracosanoic acid methyl ester (MP 60° C.), pentacosanoic acid methyl ester (MP 61° C.), hexacosanoic acid methyl ester (MP 64° C.), heptacosanoic acid methyl ester (MP 64° C.), octacosanoic acid methyl ester (MP 67° C.), nonacosanoic acid methyl ester (MP 69° C.), triacontanoic acid (MP 72° C.), and particularly those having a melting point in a range of 60° C. to 80° C.

Stearic acid in particular is not water soluble but melts below 100° C. to allow it to melt and mix in the aqueous solution that will be cast to help to provide one or more benefits including but not limited to: a low COF for film convertibility, short term surface water resistance to give the increase in Release Time when used as a pouch, as measured by the Liquid Release Test, and anti-blocking characteristics.

The release modifier (e.g. stearic acid) can optionally have an anti-blocking function. In these embodiments, as the release modifier (e.g. stearic acid) concentration approaches 0 the blocking force will tend to increase; minimum level of release modifier (e.g. stearic acid) is contemplated, and above a certain concentration there will be limited if any further reduction the blocking force provided by the release modifier (e.g. stearic acid). This is schematically shown the FIG. 1.

With regard to the Release Time as measured by the Liquid Release Test the effect of the release modifier (e.g. stearic acid) is contemplated to be the opposite trend of FIG. 1. That is, at low levels of release modifier (e.g. stearic acid), there will little if any effect on increasing the Release Time as measured by the Liquid Release Test, then at a threshold the release time will start to increase and then plateau.

An optimum concentration for the release modifier (e.g. stearic acid) may, in some embodiments, depend upon the method of converting the film into a pouch. If the film is converted into an pouch using heat sealing, then it could easily tolerate a higher loading of release modifier (e.g. stearic acid) than it would if the pouch seal is a solvent seal (e.g., water seal). This is because the heat seal is formed from the fusion of the melted PVOH and is more affected by the bulk of the film properties than just the film surface, where the release modifier (e.g. stearic acid) may concentrate in some embodiments. If the release modifier (e.g. stearic acid) is preferentially at the surface, then water will not dissolve the stearic acid; therefore the PVOH will not be readily solubilized to form a good seal. Without intending to be limited to any particular theory, it is believed that with some release modifiers, e.g. stearic acid, the air side of the film (in contrast to the band side of the film) will be richer in release modifier. This inhomogeneity can be advantageous in some embodiments, as it would for better sealing of the film at band-to-band sides/surfaces of the film, while the air sides/surfaces, which could form the exterior of the pouch, and thus would be exposed to bulk water, would less soluble, thus favorably increasing the Release Time performance as measured by the Liquid Release Test.

Generally, the release modifier (e.g. stearic acid) can be present in the film in an amount of at least 0.1 PHR, or at least 0.5 PHR, or at least 1 PHR, or in a range of about 0.1 to 3.0 PHR, or about 0.3 to about 2.0 PHR, or about 0.4 to 1.0 PHR, or about 0.5 to about 0.9 PHR, or 1.0 to 1.5 PHR, or about 0.5 to about 2 PHR, or about 0.5 to about 1.5 PHR, or 0.1 to 1.2 PHR, for example 0.5 PHR, 0.6 PHR, 0.7 PHR, 0.8 PHR, 0.9 PHR, 1.0 PHR, 1.1 PHR, 1.2 PHR, 1.3 PHR, 1.4 PHR, or 1.5 PHR.

Those skilled in the art will readily appreciate that as the plasticizer levels increase the mechanical properties of the resulting film decrease, and the film will dissolve more quickly. Therefore, the optimum level of the release modifier (e.g. stearic acid) is contemplated, in some embodiments, to be related to the plasticizer concentration in the film. At lower levels of plasticizers the film is less soluble, consequently a lower level of release modifier (e.g., stearic acid) may be needed to assure that the film meets the minimum 30 second Release Time target as measured by the Liquid Release Test. Conversely, as more plasticizer is added to the film, the film tends to dissolve more readily and also the blocking force tends to increase; consequently, a higher loading of both the anti-block filler (e.g., $SiO_2$) and release modifier (e.g. stearic acid) could be needed to achieve the best performance.

Thus, for example, the ratio of release modifier (e.g. stearic acid) to total plasticizers can be in a range of about 1:20 to about 1:40, or about 1:28 to about 1:40, for example 1:31, 1:32, 1:33, 1:34, 1:35, or 1:36 by weight. In another type of embodiment, the ratio can be in a range of 1:20 to 1:36, for example.

Another aspect of the film formulation to consider is the total level of anti-block filler (e.g. $SiO_2$) combined with release modifier (e.g. stearic acid). Particularly contemplated are values in a range of at least at least 0.2 PHR, or at least 0.5 PHR, at least 1 PHR, and at least 1.5 PHR, and up to 4 PHR, or less than 4 PHR, or less than 3.5 PHR or less than 3 PHR, or less than 2 PHR, or 1.5 PHR or less, or up to 3.5 PHR, or up to 3 PHR, for example about 1.0 PHR to about 4 PHR, or 1.0 PHR to about 3 PHR, or about 1.0 PHR to 2.0 PHR. A minimum of each component of at least 0.1 PHR to 0.5 PHR, or at least 0.1 PHR, or at least 0.5 PHR is also contemplated. A maximum of each component of 1.5 to 2.5 PHR is also contemplated, e.g. 1.5 PHR, 2.0 PHR, or 2.5 PHR.

Another aspect of the film formulation to consider is the ratio of the total level of anti-block filler (e.g. $SiO_2$) combined with release modifier (e.g. stearic acid) to the total amount of plasticizers. Particularly contemplated are ratios in a range of about 1:5 to 1:21 or about 1:12 to about 1:21, or about 1:15 to about 1:18, for example 1:14, 1:15, 1:16, 1:17, 1:18, or 1:19 by weight. In another type of embodiment, the ratio of the total level of anti-block filler (e.g. $SiO_2$) combined with release modifier (e.g. stearic acid) to the total amount of plasticizers can be less than 1:14, or less than 1:13, or less than 1:8, or less than 1:7, or less than 1:6, for example in a range of 1:5 to 1:12, or 1:5 to 1:7.

Another aspect of the film formulation to consider is the weight ratio of total level of anti-block fillers (e.g. $SiO_2$) to release modifiers (e.g. stearic acid). Particularly contemplated are ranges of 1:3 to 3:1, or 1:2 to 2:1, or less than 2:1, or less than 1.5:1, or 1:1, or less than 1:1, or 1:1.5, or 1:2, or 1:3, for example.

Auxiliary Film Ingredients

The water-soluble film can contain other auxiliary agents and processing agents, such as, but not limited to, plasticizer compatibilizers, surfactants, lubricants, release agents, fillers, extenders, cross-linking agents, antiblocking agents, antioxidants, detackifying agents, antifoams (defoamers), nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionic s), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water-soluble film is in a range of about 0.1 wt % to 2.5 wt %, optionally about 1.0 wt % to 2.0 wt %.

Residual Moisture

The water-soluble film can further have a residual moisture content of at least 4 wt. %, for example in a range of about 4 to about 10 wt. %, as measured by Karl Fischer titration.

Cold Water Solubility

As noted above, the present films and articles made therefrom are particularly suited for cold water dissolution and therefore provide benefits in cold-water washes (e.g., from about 1° C. to about 30° C., or from about 5° C. to about 20° C.).

Residue

The water-soluble film is characterized by a residue value of about 48 wt. % or less as measured by the Dissolution Chamber Test. In another refinement, the water-soluble film has a residue value of less than 48 wt. % as measured by the Dissolution Chamber Test (e.g., about 10 wt. %, 20 wt. %, 30 wt. %, or 35 wt. % to about 40 wt. %, or about 40 wt. % to about 45 wt. %).

Dissolution Chamber Test

The Dissolution Chamber Test for residue measures film dissolving under static conditions, and is diffusion driven. The results of Dissolution Chamber testing do not correlate well with Corrected Dissolution Times. Corrected Dissolution Times are based on film dissolving under dynamic stress (moving water). The Dissolution Chamber test is thus more representative of how well a film would dissolve under static conditions, such as a laundry detergent pouch being trapped between folds of fabric during a laundry cycle.

A water-soluble film characterized by or to be tested for undissolved residue according to the Dissolution Chamber (DC) Test is analyzed as follows using the following materials:

1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48.5 mm), 0.125" thick (3.18 mm));
4. Stainless steel screens (3.0" (76.2 mm) OD, 200×200 mesh, 0.0021" (0.053 mm) wire OD, 304SS stainless steel wire cloth);
5. Thermometer (0° C. to 100° C., accurate to +/−1° C.);
6. Cutting punch (1.5" (38.1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 3.0±0.10 mil (or 76.2±2.5 μm) using the cutting punch. If cut from a film web made by a continuous process, the specimens should be cut from areas of web evenly spaced along the transverse direction of the web (i.e., perpendicular to the machine direction). Each test specimen is then analyzed using the following procedure:

1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back away from the screens.
5. Fill the beaker with 1,500 ml of RO water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.
8. At the prescribed elapsed prescribed immersion time of 5 minutes, slowly remove the dissolution chamber assembly from the beaker at an approximate 45 degree angle.
9. Hold the dissolution chamber assembly horizontally over the aluminum pan to catch any drips from the screens and carefully remove the binder clips, washers, and gaskets. Do not break open the sandwiched screens.
10. Place the sandwiched screens (i.e., screen/residual undissolved film/screen) over the aluminum pan and into an oven at 100° C. for 30 minutes to dry.
11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).
12. Calculate % residue ("DC residue") left for the film specimen: % DC residue=$100*((S_f-S_o)/F_o)$.
13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Unless explicitly described otherwise, all results described herein are representative of DC residue times for 5 minutes dissolution time, i.e. DC (5 min) residue.

Suitable behavior of water-soluble films according to the disclosure is marked by DC residue values of about 25 wt. % or less or about 20 wt. % or less as measured by the DC Test. Generally, lower DC residue values are desirable to reduce the likelihood of residual film remaining on a washed article after aggressive washing conditions (e.g., in low water conditions (such as in overloading of the washing machine) and in cold wash water conditions). In various embodiments, the water-soluble film has a DC residue value of at least 1, 2, 3, 4, 5, 10, or 12 wt. % and/or up to about 25, 20, 18, 15, 12, 10, 8, or 6 wt. %; (e.g., in a range of about 2 wt. % to about 25 wt. %, or about 2 wt. % to about 20 wt. %, or about 3 wt. % to about 18 wt. %, or about 4 wt. % to about 6 wt. %, or about 5 wt. % to about 12 wt. %, or about 7 wt. % to about 10 wt. %).

Dissolution and Disintegration Test (MSTM 205)

A film can be characterized by or tested for Dissolution Time and Disintegration Time according to the MonoSol Test Method 205 (MSTM 205), a method known in the art. See, for example, U.S. Pat. No. 7,022,656.

Apparatus and Materials:
1. 600 mL Beaker
2. Magnetic Stirrer (Labline Model No. 1250 or equivalent)
3. Magnetic Stirring Rod (5 cm)
4. Thermometer (0 to 100° C.±1° C.)
5. Template, Stainless Steel (3.8 cm×3.2 cm)
6. Timer (0-300 seconds, accurate to the nearest second)
7. Polaroid 35 mm slide Mount (or equivalent)
8. MonoSol 35 mm Slide Mount Holder (or equivalent)
9. Distilled water For each film to be tested, three test specimens are cut from a film sample using stainless steel template (i.e., 3.8 cm×3.2 cm specimen). If cut from a film web, specimens should be cut from areas of web evenly spaced along the traverse direction of the web. Each test specimen is then analyzed using the following procedure.

1. Lock each specimen in a separate 35 mm slide mount.
2. Fill beaker with 500 mL of distilled water. Measure water temperature with thermometer and, if necessary, heat or cool water to maintain temperature at 20° C. (about 68° F.).
3. Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.
4. Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the film surface is perpendicular to the flow of the water.
5. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

The results should include the following: complete sample identification; individual and average disintegration and dissolution times; and water temperature at which the samples were tested.

Film disintegration times (I) and film dissolution times (I) can be corrected to a standard or reference film thickness using the exponential algorithms shown below in Equation 1 and Equation 2, respectively.

$$I_{corrected}=I_{measured}\times(\text{reference thickness/measured thickness})^{1.93} \quad [1]$$

$$S_{corrected}=S_{measured}\times(\text{reference thickness/measured thickness})^{1.83} \quad [2]$$

Mechanical Properties

Coefficient of Friction Test

The Coefficient of Friction method tests the friction of two pieces of material that are rubbed against each other; the force required to move one piece against the other is measured. The force to start the sled (static friction) and the force to keep the sled moving (dynamic friction) are both measured by the load cell using ASTM D1894 "Friction Testing of Plastic Film and Sheeting."

Figure 2:
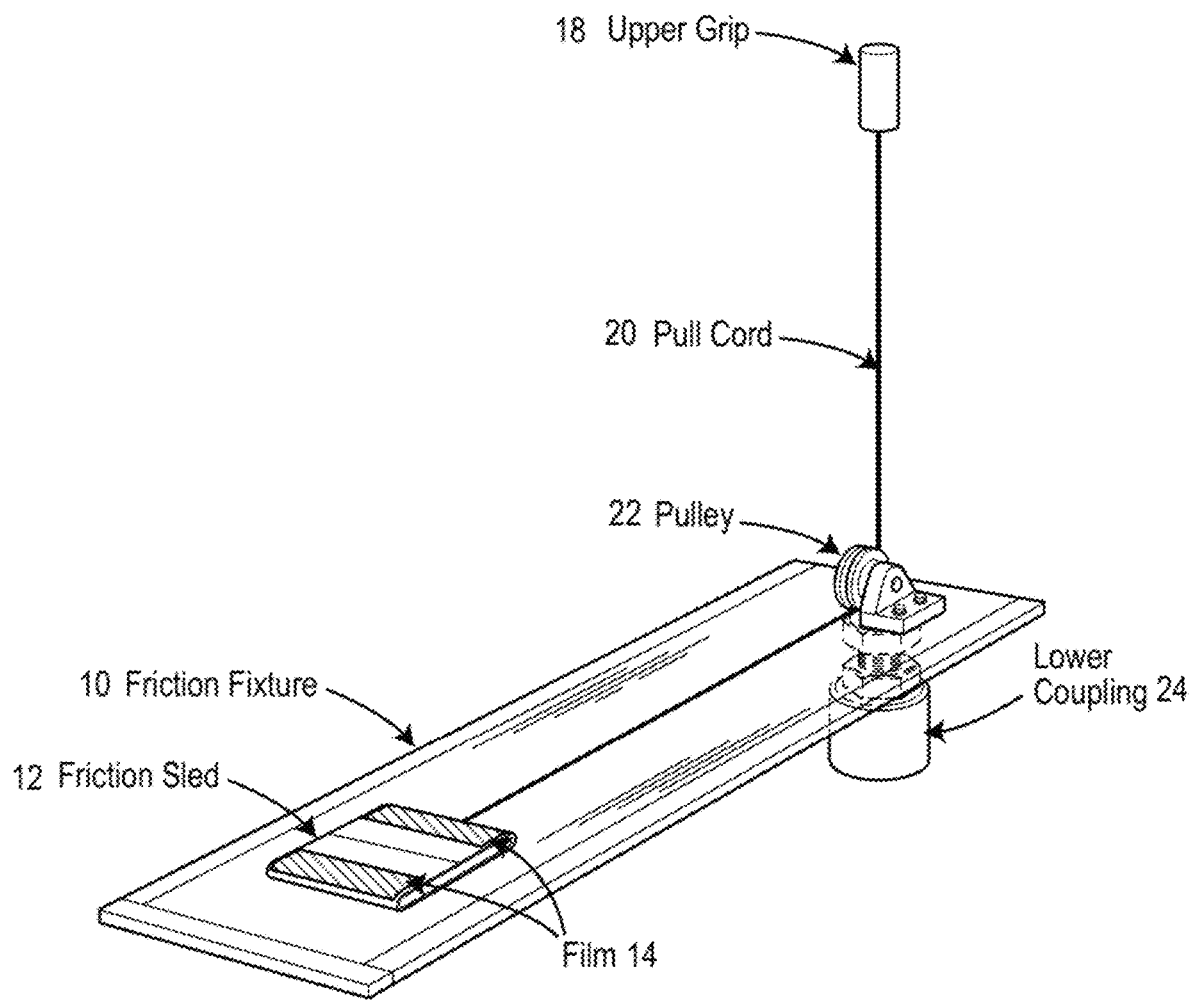
FIG. 2 shows an example of an apparatus for measuring the coefficient of friction of a film specimen.

The method uses an Instron® Coefficient of Friction Testing Fixture Model 12810-005, or equivalent, a representative diagram of which is shown in FIG. 2, and an Instron® Testing Machine Model #5543, or equivalent.

The testing apparatus includes a friction fixture 10 upon which rests a friction sled 12 having secured thereon a film sample 14. The sled 12 is coupled to the upper grip 18 via a pull cord 20 which engages with pulley 22 secured to the friction fixture 10. The lower coupling 24 secures the testing fixture to the Instron® testing machine (not shown).

According the Instron® method Blue Hill program: "The system: searches the data from the start value to the end value on the specified channel for the maximum value; determines the first data point that rises and falls by the percentage of the maximum value and assigns this point as the first peak; uses the following equation to determine the coefficient of static friction: static friction=first peak/sled weight; uses the following equation to calculate the average load of the area from the first peak to the end value: average load=energy/change in extension; and uses the following equation to determine the coefficient of dynamic friction: dynamic friction=average load/sled weight."

The test specimen shall consist of samples having dimensions (5 inch by 5 inch square (12.7 cm by 12.7 cm square) for the sled and 5 inch by 8 inch rectangle (12.7 cm by 20.3 cm) for the surface, to form a testing area. While it is believed that the film thickness will not affect the Static COF, the film can have a thickness of 3.0±0.10 mil (or 76.2±2.5 µm). The samples can be cut using a razor blade and templates of the appropriate dimensions, for example. When applicable, the sample should be cut with the long dimension parallel to the machine direction of the cast film. Again when applicable, the 5 inch×5 inch sample direction should be noted and oriented in the test so that the direction the sled is being pulled is parallel to the machine direction of the film sample.

The test specimen shall be conditioned at 75° F.±5° F. and relative humidity 35%±5% for not less than 8 hours prior to the test, and the test is conducted at the same temperature and relative humidity conditions.

Installation Procedure of COF a Apparatus
1. Remove the clevis pin from the lower jaw on the Instron® Coefficient of Friction Testing Fixture Model 2810-005, and remove.
2. Remove the clevis pin from the upper jaw, and remove.
3. Place the friction fixture lower coupling onto the base adapter of the Instron® Testing Machine Model #5543.
4. Fit it with the clevis pin.
5. Slip the loop of one end of the pull cord onto the upper clevis pin, and replace the locking clip.
6. Calibrate Testing Machine Model #5543
7. Slip the loop on the other end of the pull cord onto the friction sled hook.
8. Make sure the pulley is able to spin freely
9. Move the sled till the pull cord has no slack and is oriented in the groove around the pulley.
10. Position the moving crosshead (upper heard) of the Instron® Coefficient of Friction Testing Fixture Model 2810-005 so that there is sufficient travel space to draw the friction sled along the full 50 mm of the test without running the sled into the pulley.
11. Keep the cord taught while the crosshead is moving.
12. Using the JOG control on the Instron #5543 control panel, set the extension limit so that the far end of the friction sled does not exceed the back plane (the plane perpendicular to the axis of motion, and furthest from the pulley) of the friction fixture. Press the GL button to set the travel limit. This prevents the friction sled from colliding with the pulley during the test, and insures that the coefficient of friction of the sample of interest is properly measured.

13. The test fixture is now ready for testing.

Placement of Specimen Procedure

1. Place the surface sample on the aluminum friction fixture in the appropriate orientation.
2. Pull the surface sample tight over the edges of the aluminum surface and tape the sample on the bottom side of the friction fixture.
3. It is important to tape along the end of the friction fixture furthest from the coupling to avoid binding of the sled on the surface.
4. Make sure that the material is taught but not stretched.
5. Wrap the friction sled with the 5×5 inch sample so that the machine direction of the film is parallel to the direction the sled will be pulled.
6. Tape the leading edge overlap on the top of the sled making sure there is no excess material which will bind up on the surface sample,
7. Tape the other edges of the sample on the friction sled to ensure the sample is taught on the contact surface being measured.
8. Be sure that no tape will get between the surface of interest on the sled and on the friction fixture.
9. The samples on the friction surface and on the friction sled should be taught with no wrinkles or bulges; these will cause errors in measuring the COF.
10. Inspect the sled to be sure there are no foreign materials touching the surfaces being tested.
11. Attach the sled to the pull cord and place the sled very lightly and gently on the friction table in order to prevent any unnatural bond from developing between the two specimens, being test promptly.
12. Be sure that at full extension the sled sits completely over the sample placed on the friction fixture and does not contact tape or hang over the edge of the friction fixture.

Performing the COF Test

1. Test not less than three specimens per requested orientation (example air side air side or band side band side).
2. For a combination of air side to band side testing, the air side orientation of the film should be the film sample placed on the aluminum test surface, and the band side for testing should comprise the material wrapped around the sled.
3. Be sure to wear powder-free, moisture barrier gloves while handling the film specimens; powder or moisture may compromise the accuracy of the test.
4. Cut a sample as described above, e.g. using a template.
5. Place the friction sled wrapped in the first specimen at the end of the friction fixture furthest from the pulley.
6. Make sure the pull cord is pulled taught.
7. Open the Coefficient of Friction test titled "COF.im ptf" from the testing screen.
8. Click the start button on the screen to begin the test.
9. Upon completion of the specimen test nm, click ok and return the friction sled to the starting position and change the film specimen on the friction sled and the fixture. Repeat the test.

The film can be characterized by a static COF in a range of 4.0 or less, or 2.0 or less, or 1.5 or less, or 1.25 or less, or 1.0 or less, for example 1.0, 0.9, 0.8, 0.7, 0.6, or even less. In another aspect, the static COF can be less than 4.0, or less than about 2.4, or less than 2, or less than 1.

In one aspect, the film can be characterized by having a Static COF less than 0.45, a tensile strength in a range of 40 to 60 MPa and a tear strength in a range of 1000 to 2100 g/mil, or 1150 to 2100 g/mil.

Tensile Strength Test and Modulus Test (ASTM D 882)

A film characterized by or to be tested for tensile strength according to the Tensile Strength Test and modulus (or tensile stress) according to the Modulus Test is analyzed as follows. The procedure includes the determination of Tensile Strength and the determination of Modulus at 10% elongation according to ASTM D 882 ("Standard Test Method for Tensile Properties of Thin Plastic Sheeting") or equivalent. An INSTRON® tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 µm) are prepared. The sample is then transferred to the INSTRON® tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON® grips having model number 2702-032 faces, which are rubber coated and 25 mm wide, or equivalent). The samples are mounted into the tensile testing machine and analyzed to determine the Modulus at 10% (i.e., stress required to achieve 10% film elongation) and Tensile Strength (i.e., stress required to break film).

Suitable behavior of films according to the disclosure is marked by Tensile Strength values of at least about 20 MPa as measured by the Tensile Strength Test. Generally, higher Tensile Strength values are desirable because they correspond to stronger pouch seals when the film is the limiting or weakest element of a seal. In various embodiments, the film has a Tensile Strength value of at least 20 MPa and/or up to about 60 MPa (e.g., about 20, about 30, about 40, about 50 or about 60 MPa).

Suitable behavior of films according to the disclosure is marked by Modulus at 10% values of at least about 5 N/mm$^2$ as measured by the Modulus Test. Generally, higher values of Modulus at 10% are desirable from the perspective of providing pouches having a greater stiffness and a lower likelihood of deforming and sticking to each other when loaded on top of each other during production. In various embodiments, the film has a Modulus at 10% value of at least about 5 N/mm$^2$ and/or up to about 80 N/mm$^2$ or 100 N/mm$^2$ (e.g., about 5, about 10, about 20, about 30, about 40, about 50, about 60, about 70, about 80, about 90, or about 100 N/mm$^2$).

Tear Strength

Tear Strength (in g/mil, measured at 23° C.) can be evaluated using an Elmdorf Tearing Tester model number 40043, or equivalent. This method covers the determination of the average force in grams per mil of specimen thickness required to propagate tearing through a specified length of polyvinyl alcohol (PVOH) film. The force in grams required to propagate tearing across a film is measured using a precisely calibrated pendulum device. Acting by gravity, the pendulum swings through an arc, tearing the specimen from a pre-cut slit. The specimen is held stationary on one side and on the other is fixed to the pendulum. The loss of energy of the pendulum swing is indicated by a pointer on a scale. The scale indication is a function of the force required to tear the specimen. This method is of value in ranking relative tearing resistance of PVOH films. The water-soluble films can be evaluated on an Elmendorf Tearing Tester Model #40043, on films preconditioned at temperature (75° F.±5° F.) (about 24° C.) and relative humidity (35%±5%) for not less than 8 hours prior to the test.

In various embodiments, the films described herein will have a tear strength of at least 1000 g/mil, or at least 1150 g/mil, or at least 1700 g/mil, or in a range of 1000-2000 g/mil, or 1150 to 2000 g/mil, or 1700 to 2000 g/mil, for example.

Pouch Making

Figure 3:
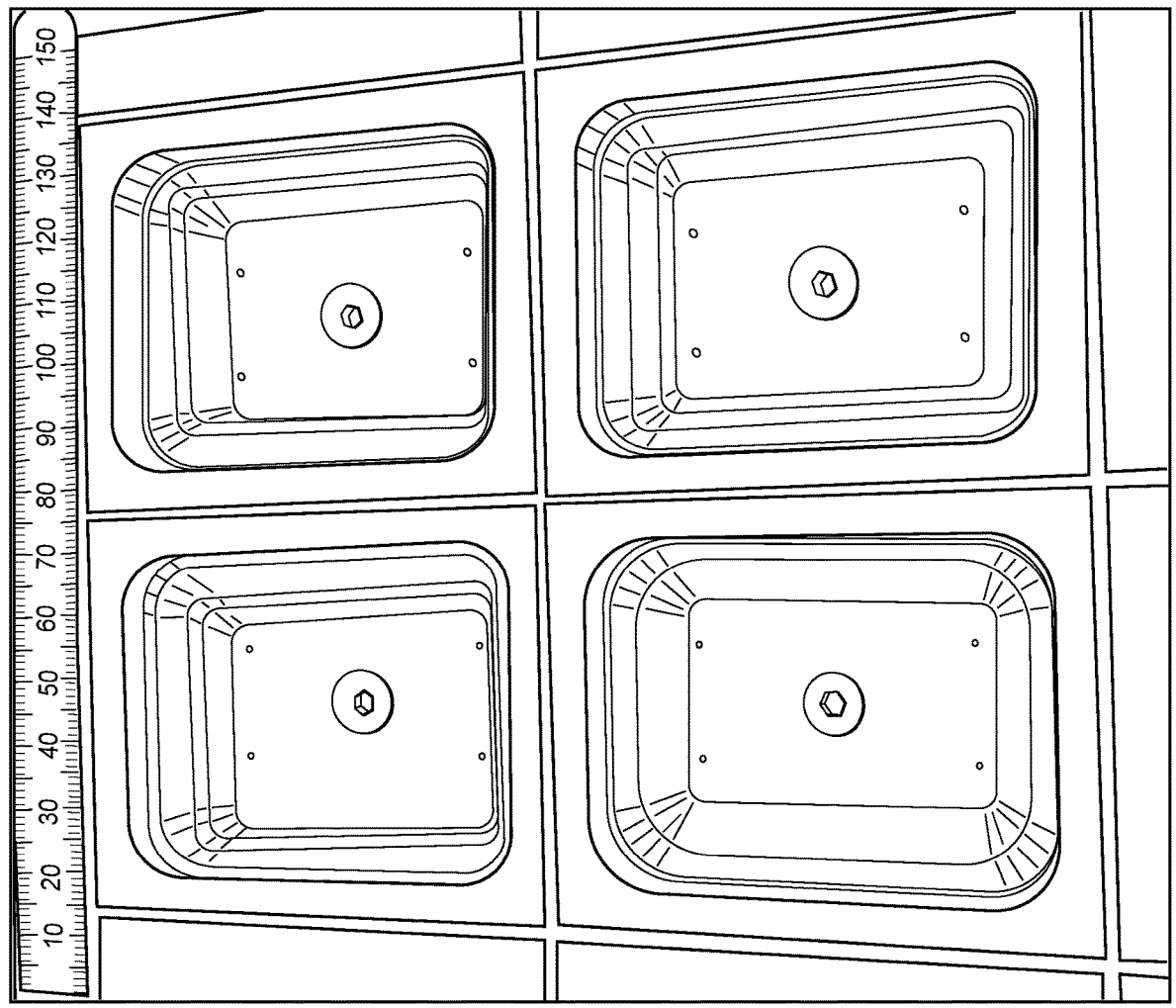
FIG. 3 shows an example of a test cup cavity block containing four cavities.

Single-compartment test pouches can be made using a Cloud Packaging Equipment PVA Sample Making Machine #3657 and a test cup cavity block containing four cavities, as shown in FIG. 3.

The mold cavity shape used to thermoform the film and create the test packet is defined by a bottom interior wall and a plurality of upstanding interior sidewalls. When viewed from above, the upstanding interior sidewalls define a generally rectangular shape. A first pair of the upstanding interior sidewalls are separated from each other by a distance of 2.489 inches, and a second pair of the upstanding interior sidewalls are separated from each other by a distance of 1.899 inches. Additionally, the transition between the bottom interior wall and each one of the upstanding interior sidewalls is defined by a radius of curvature of 0.375 inches. In addition, the transition between each upstanding interior sidewall and an adjacent upstanding interior sidewall will have a radius of curvature of 0.375 inches. Furthermore, the mold cavity will have a depth defined by a distance between the bottom interior wall and an open end of the mold, equal to 0.375 inches. The radii of curvature enable the mold to impart the film packet with rounded corners forming the generally rectangular packet shape and a rounded transition to the bottom film surface. Finally, the cavity is provided holes along the bottom surface in order to draw vacuum on the film and pull the film into the mold, in accordance with typical vacuum thermoforming and the operation of the PVA Sample Making Machine #3657.

In practice, the mold cavity (test cup block) can include multiple cavities with identical mold cavity shapes, in order to form multiple pouches at once. In principle, the mold cavity could include multiple cavities with different mold cavity shapes, to test different configurations where substantially the only variable is the cavity configuration. A base film is thermoformed in the mold cavities. Each cavity is filled with 35 ml of the Test Solution, and then the same type of film is fed to the machine for use as lid stock film. In accordance with the PVA Sample Making Machine #3657 operation, the lid stock film is then sealed to the base film using water and pressure to bond the base and lid films together around the filled cavities, and after sealing the filled pouches are divided by cutting the surrounding film.

The film will have a thickness of 3.0±0.10 mil (or 76.2±2.5 μm). The forming and sealing parameters are tabulated below.

Forming parameters: Heater temperature—500° F.; Heat time—10 sec; Vacuum applied was −24.7 in Hg.

Sealing parameters: Wick roll speed—60; Water level—60; Drive Roll Speed—57 (these are all unitless setpoints); Web Drive Time—13 sec; Water Apply Time—6 sec; Tension Time—0.1 sec; Sealing Time—20 sec; Lid sealing pressure—6.8 bar.

Test Solution

The test solution (sample laundry detergent) for filling into a pouch before pouch testing for release is described in Table 1 below. It is well within the means of the ordinary skilled artisan to form, fill, and seal a pouch in view of the disclosure herein.

TABLE 1

| Ingredient | Wt. % of Test Solution |
| --- | --- |
| Monoethanolamine | 8.57% |
| Dodecylbenzenesulfonic Acid | 23.81% |
| Oleic Acid | 19.05% |
| Lauryl Alcohol Ethoxylate - 7EO | 23.81% |
| Propylene Glycol | 9.52% |
| Diethylene Glycol | 9.52% |
| Water | 5.71% |

Liquid Release Test

A water-soluble film and/or pouch characterized by or to be tested for delayed solubility according to the Liquid Release Test is analyzed as follows using the following materials:

2 L beaker and 1.2 liters of deionized (DI) water

Water soluble pouch to be tested (made as described above, using the Pouch Making and Test Solution descriptions); the film has a thickness of 3.0±0.10 mil (or 76.2±2.5 μm); the pouch is pre-conditioned for two weeks at 38° C.

Thermometer

Wire cage

Timer

Before running the experiment, ensure that enough DI water is available to repeat the experiment five times, and ensure that the wire cage and beaker are clean and dry.

Figure 4:
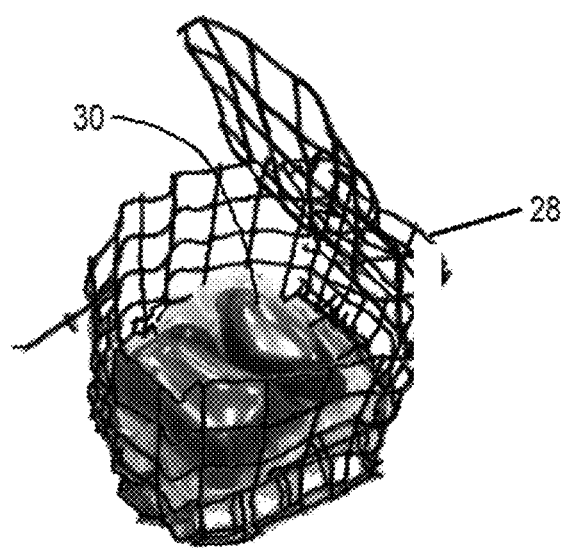
FIG. 4 illustrates an example of a wire frame cage (shown with the top open, to better illustrate water-soluble pouches contained therein) for use in the Liquid Release Test described herein.

The wire frame cage is a plastic coated wire cage (4"×3.5"×2.5") with no sharp edges, or equivalent. The gauge of the wire should be about 1.25 mm and the wire should have openings the size of 0.5 inch (1.27 cm) squares. An example image of a cage 28 with test pouches 30 is shown in FIG. 4.

To set up for the test, carefully place the water soluble pouch in the cage while not scratching the pouch on the cage and allowing free space for the pouch to move. Do not bind the pouch tightly with the wire cage, while still ensuring it is secure and will not come out of the cage. The orientation of the pouch in the cage should be such that the natural buoyancy of the pouch, if any, is allowed (i.e. the side of the pouch that will float to the top should be placed towards the top). If the pouch is symmetrical, the orientation of the pouch generally would not matter.

Next, fill the 2 L beaker with 1200 milliliters of 20° C. DI water.

Figure 5:
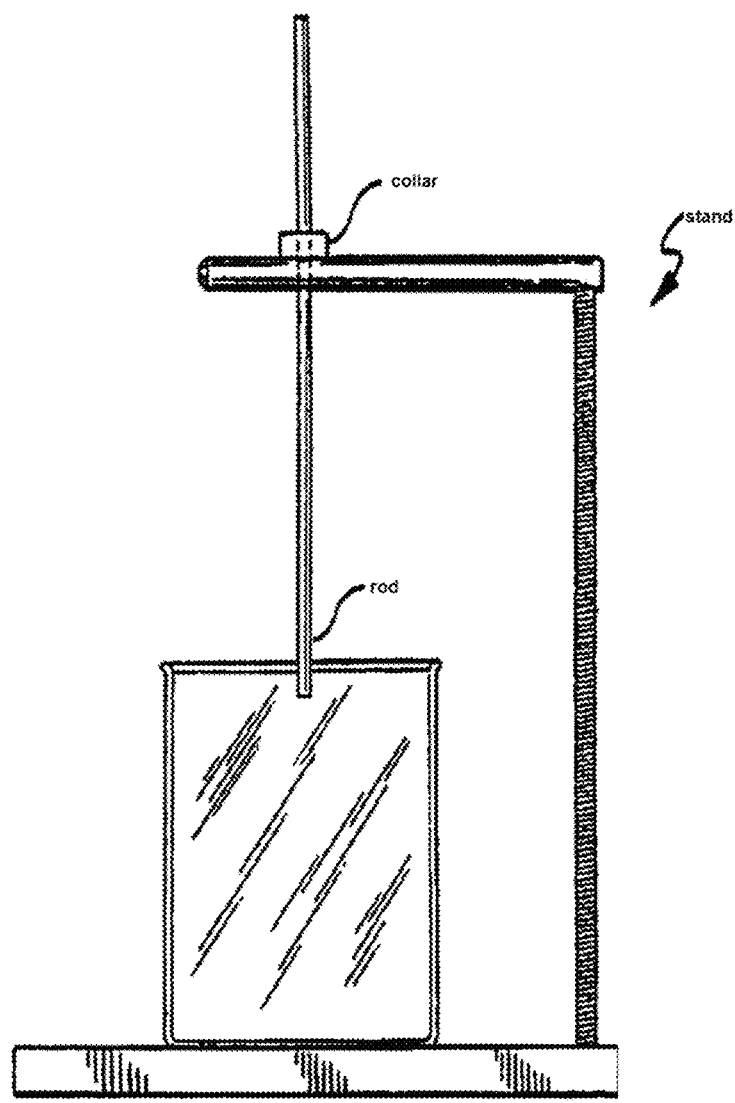
FIG. 5 shows an apparatus for performing the Liquid Release Test, including a beaker resting on a stand, the stand holding a rod for lowering a cage into the beaker, the rod being fixable by a collar with a set screw (not shown).

Next, lower the wire frame cage with the enclosed pouch into the water. Ensure that the cage is 1 inch (2.54 cm) from the bottom of the beaker. Be sure to fully submerge the pouch on all sides. Ensure that the cage is stable and will not move and start a timer as soon as the pouch is lowered into the water. The position of the cage with respect to the water in the beaker can be adjusted and maintained by any suitable means, for example by using a clamp fixed above the beaker, and a rod attached to the top of the cage. The clamp can engage the rod to fix the position of the cage, and tension on the clamp can be lowered in order to lower the cage into the water. Other means of frictional engagement can be used in the alternative to a clamp, for example a collar with a set screw, as shown in FIG. 5 (set screw not shown). FIG. 5 shows a beaker 30 resting on a stand 40, the stand holding a rod 50 for lowering a cage 10 (not shown) into the beaker 30, the rod 50 being able to hold a fixed vertical position by use of a collar 60 having a set screw (not shown) that engages the rod 50, for example by friction or by engagement with a hole (not shown) in the rod 50.

Liquid content release is defined as the first visual evidence of the liquid leaving the submerged pouch.

Use the timer to record when the liquid content is released in to the surrounding water (Release Time) with a stopping point of 45 seconds.

A pass or fail grade will be given to each pouch. A pass grade is received if the soluble pouch retained its liquid for 30 seconds or longer. A fail grade is received if the soluble pouch did not retain its liquid for at least 30 seconds.

Repeat this process with new DI water and a new water soluble pouch five times for each film being tested.

A total of 5 pouches is tested for each film sample type unless reported otherwise.

Method of Making Film

As mentioned above, the disclosure relates to the manufacture of films of polyvinyl alcohol, and particularly to solvent cast films. Processes for solvent casting of PVOH are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

Optionally, the water-soluble film can be a free-standing film consisting of one layer or a plurality of like layers.

Packets

The film is useful for creating a packet to contain a detergent composition comprising cleaning actives thereby forming a pouch. The cleaning actives may take any form such as powders, gels, pastes, liquids, tablets or any combination thereof. The film is also useful for any other application in which improved wet handling and low cold water residues are desired. The film forms at least one side wall of the pouch and/or packet, optionally the entire pouch and/or packet, and preferably an outer surface of the at least one sidewall.

The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH copolymer described above, as described above, being at least 60%.

The pouches of the present disclosure can include at least one sealed compartment. Thus, the pouches may comprise a single compartment or multiple compartments. A water-soluble pouch can be formed from two layers of water-soluble polymer film sealed at an interface, or by a single film that is folded upon itself and sealed. One or both of the films include the PVOH film described above. The films define an interior pouch container volume which contains any desired composition for release into an aqueous environment. The composition is not particularly limited, for example including any of the variety of cleaning compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second, and third composition. Liquid detergents are particularly contemplated.

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration, or in a pouch-in-a-pouch configuration.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different.

In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

In one embodiment, the packet comprises a first and a second sealed compartment. The second compartment is in a generally superposed relationship with the first sealed compartment such that the second sealed compartment and the first sealed compartment share a partitioning wall interior to the pouch.

In one embodiment, the packet comprising a first and a second compartment further comprises a third sealed compartment. The third sealed compartment is in a generally superposed relationship with the first sealed compartment such that the third sealed compartment and the first sealed compartment share a partitioning wall interior to the pouch.

In some embodiments, the first composition and the second composition are selected from one of the following combinations: liquid, liquid; liquid, powder; powder, powder; and powder, liquid.

In some embodiments, the first, second and third compositions are selected from one of the following combinations: solid, liquid, liquid and liquid, liquid, liquid.

In one embodiment, the single compartment or plurality of sealed compartments contains a composition. The plurality of compartments may each contain the same or a different composition. The composition is selected from a liquid, solid or combination thereof.

In one embodiment, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

Shaping, Sealing, and Thermoforming

As mentioned above, the film described herein is thermoformable. A thermoformable film is one that can be shaped through the application of heat and a force.

Thermoforming a film is the process of heating the film, shaping it (e.g. in a mold), and then allowing the film to cool, whereupon the film will hold its shape, e.g. the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature in a range of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In some embodiments, pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031.

In some embodiments, pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

In some embodiments, the film and/or pouch is sprayed or dusted with a suitable material, such as an active agent, a lubricant, an aversive agent, or mixtures thereof. In some embodiments, the film and/or pouch is printed upon, for example, with an ink and/or an active agent.

Pouch Contents

The present articles (e.g., in the form of pouches or packets) may contain various compositions, for example household care compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

As described above, the film and pouch are particularly advantageous for packaging (e.g., in direct contact with) materials which have exchangeable hydrogen ions, for example compositions characterized by acid/base equilibria, such as amine-fatty acid equilibria and/or amine-anionic surfactant acid equilibria.

This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions encapsulated by the films described herein can have any suitable viscosity depending on factors such as formulated ingredients and purpose of the composition. In one embodiment, the composition has a high shear viscosity value, at a shear rate of $20$ $s^{-1}$ and a temperature of 20° C., of 100 to 3,000 cP, alternatively 300 to 2,000 cP, alternatively 500 to 1,000 cP, and a low shear viscosity value, at a shear rate of $1$ $s^{-1}$ and a temperature of 20° C., of 500 to 100,000 cP, alternatively 1000 to 10,000 cP, alternatively 1,300 to 5,000 cP. Methods to measure viscosity are known in the art. According to the present invention viscosity measurements are carried out using a rotational rheometer e.g. TA instruments AR550. The instrument includes a 40 mm 2° or 1° cone fixture with a gap of around 50-60 µm for isotropic liquids, or a 40 mm flat steel plate with a gap of 1000 µm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s$^{-1}$, and an equilibration of 60 seconds at the selected temperature. The peak hold involves applying a shear rate of 0.05 s$^{-1}$ at 20° C. for 3 min with sampling every 10 s. The continuous ramp step is performed at a shear rate from 0.1 to 1200 s$^{-1}$ for 3 min at 20° C. to obtain the full flow profile.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶ 165-77); cationic starches (see: US 2004/0204337 A1 and US 2007/0219111 A1); scum dispersants (see: US 2003/0126282 A1, ¶ 89-90); substantive dyes; hueing dyes (see: US 2014/0162929A1); colorants; opacifier; antioxidant; hydrotropes such as toluenesulfonates, cumenesulfonates and naphthalenesulfonates; color speckles; colored beads, spheres or extrudates; clay softening agents; anti-bacterial agents. Any one or more of these ingredients is further described in described in European Patent Application Number 09161692.0, U.S. Publication Number 2003/0139312A1 and U.S. Patent Application No. 61/229,981. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure NR$_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222,905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the present compositions can be a solvent system containing water alone or mixtures of organic solvents with water. Preferred organic solvents include 1,2-propanediol, ethanol, glycerol, dipropylene glycol, 2-methyl-1,3-propanediol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%. Typically, the present compositions, particularly when in liquid form, comprise less than 50% water, preferably from about 0.1% to about 20% water, or more preferably from about 0.5% to about 15%, or from about 5% to about 12%, by weight of the composition, of water.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be from about 2 to about 12, about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of from about 2 or 4 to about 8, or from about 2 to about 4, or from about 2.5 to about 3.5, or from about 2.7 to about 3.3.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark—Keppekouter, Ninovesteenweg 198, 9320 Erembodegem—Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4.n.Na_2CO_3$ wherein n is from 0.1 to 3, preferably from 0.3 to 1.0, and more preferably from 0.2 to 0.5. Another suitable coating material providing in product stability comprises sodium silicate of $SiO_2:Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and aralipathic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. Nos. 4,246,612, 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, incorporated herein by reference.

Dishwashing Agents

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants suitable for use herein are disclosed, for example, in U.S. Pat. Nos. 3,929,678, 4,259,217, EP-A-0414 549, WO-A-93/08876 and WO-A-93/08874. Surfactants can be present at a level of from about 0.2% to about 30% by weight, more preferably from about 0.5% to about 10% by weight, most preferably from about 1% to about 5% by weight of a detergent composition.

Other Compositions and Additives

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME and CELLUZYME (Novo Nordisk A/S); peroxidases; lipases including AMANO-P (Amano Pharmaceutical Co.), M1 LIPASE and LIPOMAX (Gist-Brocades) and LIPOLASE and LIPOLASE ULTRA (Novo); cutinases; proteases including ESPERASE, ALCALASE, DURAZYM and SAVINASE (Novo) and MAXATASE, MAXACAL, PROPERASE and MAXAPEM (Gist-Brocades); a and 13 amylases including PURAFECT OX AM (Genencor) and TERMAMYL, BAN, FUNGAMYL, DURAMYL, and NATALASE (Novo); pectinases; and mixtures thereof. Enzymes can be added herein as prills, granulates, or cogranulates at levels typically in the range from about 0.0001% to about 2% pure enzyme by weight of the cleaning composition.

Suds suppressers suitable for use in the detergent composition described herein include nonionic surfactants having a low cloud point. "Cloud point" as used herein, is a well-known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT SLF18) and epoxy-capped poly(oxyalkylated) alcohols (e.g., BASF POLY-TERGENT SLF18B series of nonionics, as described, for example, in U.S. Pat. No. 5,576,281).

Other suitable components for use in the detergent composition described herein include cleaning polymers having anti-redeposition, soil release or other detergency properties. Anti-redeposition polymers for use herein include acrylic acid containing polymers such as SOKALAN PA30, PA20, PA15, PA10 and SOKALAN CP10 (BASF GmbH), ACU-SOL 45N, 480N, 460N (Rohm and Haas), acrylic acid/maleic acid copolymers such as SOKALAN CP5, and acrylic/methacrylic copolymers. Other suitable polymers include amine-based polymers such as alkoxylated polyalkyleneimines (e.g., PEI600 E020 and/or ethoxysulfated hexamethylene diamine dimethyl quats), which, optionally, may be quaternized. Soil release polymers for use herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hex amethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. European Patent 0 197 434 B1 describes rinse aids which contain mixed ethers as surfactants. Rinse additives such as fabric softeners and the like are also contemplated and suitable for encapsulation in a film according to the disclosure herein.

Methods of Use

The films and articles described herein, as well as compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein.

Examples of particularly contemplated aspects (A1, A2, etc.) of the films described herein are described below.

A1. A water-soluble film, comprising a mixture of a water-soluble polyvinyl alcohol, a plasticizer, an anti-block filler, and a release modifier.

A2. The water-soluble film of A1, wherein the anti-block filler comprises untreated synthetic amorphous silica.

A3. The water-soluble film of A2, wherein the filler has a median particle size in a range of about 3 to about 11 microns, or about 4 to about 8 microns.

A4. The water-soluble film of any one of the previous aspects, wherein the release modifier comprises one or more compounds selected from the group consisting of fatty acids, fatty acid esters, fatty acid amides, linear or branched versions of any of the foregoing, saturated or unsaturated versions of any of the foregoing, substituted or unsubstituted versions of any of the foregoing.

A5. The water-soluble film of A4, wherein the release modifier comprises a fatty acid, optionally stearic acid.

A6. The water-soluble film of any one of the previous aspects, wherein the release modifier has a melting point of about 90° C. or less.

A7. The water-soluble film of A6, wherein the release modifier has a melting point of about 40° C. or greater, or 50° C. or greater, or 70° C. or greater.

A8. The water-soluble film of any one of the previous aspects, wherein the anti-block filler and release modifier are present at a ratio in a range of 1:3 to 3:1, or 1:2 to 2:1, or less than 2:1, or less than 1.5:1, or 1:1, or less than 1:1, or 1:1.5, or 1:2, or 1:3.

A9. The water-soluble film of any one of the previous aspects, wherein the anti-block filler is present in an amount of at least 0.1 PHR, or at least 0.5 PHR, or at least 1 PHR, or in a range of 0.1 to 3.0 PHR, or in a range of 0.1 to 1.2 PHR, or in a range of 0.1 to 2.7 PHR, or in a range of 0.5 to 2 PHR, or in a range of 0.5 to 1.5 PHR.

A10. The water-soluble film of any one of the previous aspects, wherein the release modifier is present in an amount of at least 0.1 PHR, or at least 0.5 PHR, or at least 1 PHR, or in a range of 0.1 to 3.0 PHR, or in a range of 0.5 to 2 PHR, or in a range of 0.5 to 1.5 PHR, or in a range of 0.1 to 0.5 PHR.

A11. The water-soluble film of any one of the previous aspects, wherein the anti-block filler and release modifier are collectively present in an amount of less than 4 PHR, or less than 3.5 PHR, or less than 2 PHR, or 1.5 PHR or less.

A12. The water-soluble film of any one of the previous aspects, wherein the water-soluble polyvinyl alcohol resin comprises an anionic group modified polyvinyl alcohol.

A13. The water-soluble film of A12, wherein the anionic monomer comprises monomethyl maleate.

A14. The water-soluble film of A13, wherein the rate of anionic group modification is in a range of 1 to 10 mole %, or 1.5 to 8 mole %.

A15. The water-soluble film of any one of the previous aspects, wherein the film has a static coefficient of friction of less than 8, or less than about 2.4, or less than 1.

A16. The water-soluble film of any one of the previous aspects, wherein the film has a tear strength of at least 1000 g/mil, or at least 1150 g/mil, or in a range of 1000-2100 g/mil.

A17. A container comprising the film of any one of the previous aspects.

A18. The container of A17 further comprising a liquid detergent therein, wherein the container, when immersed into bulk water at 20° C., does not release the liquid detergent for at least 30 seconds.

A19. A water-soluble film comprising a mixture of a water-soluble polyvinyl alcohol and a plasticizer blend comprising glycerol, sorbitol, and 2-methyl-1,3-propanediol, wherein (i) the plasticizer blend is present in an amount of at least 25 PHR; or (ii) the plasticizer blend is present in an amount of at least 20 PHR and the individual components are 6.0 PHR<glycerol<13.5 PHR;

1.0 PHR<sorbitol<5.0 PHR; and 10.0 PHR<2-methyl-1,3-propanediol<15.0 PHR.

A20. The film of A19, wherein the water-soluble polyvinyl alcohol resin comprises an anionic group modified polyvinyl alcohol.

A21. The water-soluble film of A20, wherein the anionic monomer comprises monomethyl maleate.

A22. The water-soluble film of A20 or A21, wherein the rate of anionic group modification is in a range of 1 to 10 mole %, or 1.5 to 8 mole %.

A23. The water-soluble film of any one of the preceding aspects A19-A22, wherein the plasticizer blend is present in an amount up to about 40 wt %.

A24. The water-soluble film of any one of the preceding aspects A19-A23, wherein (ii) the plasticizer blend is present in an amount of at least 25 PHR and the individual components are 5.0 PHR<glycerol<11.3 PHR;

1.25 PHR<sorbitol<7.5 PHR; and 12.5 PHR<2-methyl-1,3-propanediol<18.8 PHR.

A25. The water-soluble film of any one of the preceding aspects A19-A24, wherein (ii) the plasticizer blend is present in an amount of at least 30 PHR and the individual components are 6.0 PHR<glycerol<13.5 PHR;

1.5 PHR<sorbitol<9.0 PHR; and

15 PHR<2-methyl-1,3-propanediol<22.5 PHR.

A26. The water-soluble film of any one of the preceding aspects A19-A25, wherein (ii) the plasticizer blend is present in an amount of at least 30 PHR and the individual components are 7.6 PHR<glycerol<11.8 PHR;
2.2 PHR<sorbitol<7.3 PHR; and
15 PHR<2-methyl-1,3-propanediol<18.5 PHR.

A27. The water-soluble film of any one of the preceding aspects A19-A26, wherein the polyvinyl alcohol is a maleate polyvinyl alcohol copolymer having a carboxyl pendant group modification degree in a range of 6 mol % to 10 mol %, or 7 mol % to 9 mol %, and a viscosity in a range of 10.5 cP to 22.5 cP, or 12.5 cP to about 22.5 cP, or about 15 cP to about 20 cP and a degree of hydrolysis in a range of about 80% to 99% or 85% to 95%.

A28. The water-soluble film of any one of the preceding aspects A19-A26, wherein the polyvinyl alcohol is a methyl acrylate polyvinyl alcohol copolymer resin having a degree of modification of about 4.0 to about 6.0, or about 4.5 to 5.5, and a viscosity of about 10 cP to 30 cP, or about 15 cP to about 25 cP, or about 17 cP to about 23 cP and a degree of hydrolysis of about 98.0 to about 99.8, or about 99 to about 99.8.

A29. The water-soluble film of any one of the preceding aspects A19-A28, further characterized by any one of the aspects A1-A16.

A30. A container comprising the film of any one of the previous aspects A19-A29.

A31. The container of A30 further comprising a liquid detergent therein, wherein the container, when immersed into bulk water at 20° C., does not release the liquid detergent for at least 30 seconds.

A32. A water-soluble film comprising a mixture of a water-soluble polyvinyl alcohol and a plasticizer blend comprising glycerol, sorbitol, and trimethylolpropane, wherein
(i) the plasticizer blend is present in an amount greater than 30 PHR and less than 45 PHR; or
(ii) the plasticizer blend is present in an amount of about 40 PHR to 50 PHR and the individual components are
22.5 PHR<glycerol<23.3 PHR;
10.3 PHR<sorbitol<15.0 PHR; and
7.5 PHR<trimethylolpropane<10.2 PHR.

A33. The water-soluble film of A32, wherein the plasticizer blend is present in an amount in a range of about 32.5 PH to about 42.5 PHR.

A34. The water-soluble film of A33, wherein the plasticizer blend is present in an amount greater than 30 PHR and less than 45 PHR and individual components of the plasticizer blend are:
19.5 PHR<glycerol<22.5 PHR;
6.7 PHR<sorbitol<11.7 PHR; and
6.3 PHR<trimethylolpropane<9.5 PHR.

A35. The water-soluble film of A34 wherein the individual components of the plasticizer blend are:
19.5 PHR<glycerol<22.5 PHR;
7.6 PHR<sorbitol<11.7 PHR; and
6.3 PHR<trimethylolpropane<7.5 PHR A36. The water-soluble film of A32 wherein the plasticizer blend is present in an amount of about 40 PHR to 50 PHR and the individual components are
22.5 PHR<glycerol<23.3 PHR;
13.0 PHR<sorbitol<15.0 PHR; and
7.5 PHR<trimethylolpropane<9 PHR A37. The water-soluble film of any one of the preceding aspects A32-A36, wherein the water-soluble polyvinyl alcohol resin comprises an anionic group modified polyvinyl alcohol.

A38. The water-soluble film of A37, wherein the anionic monomer comprises monomethyl maleate.

A39. The water-soluble film of A37 or A38, wherein the rate of anionic group modification is in a range of 1 to 10 mole %, or 1.5 to 8 mole %.

A40. The water-soluble film of any one of the preceding aspects A32-A39, further characterized by any one of the aspects A1-A16.

A41. A container comprising the film of any one of the previous aspects A32-A40.

A42. The container of A41 further comprising a liquid detergent therein, wherein the container, when immersed into bulk water at 20° C., does not release the liquid detergent for at least 30 seconds.

EXAMPLES

The following examples are provided for illustration and are not intended to limit the scope of the invention.

In the following examples, the PVOH resins PVOH-1 through PVOH-6 have the properties described in Table 2 below.

TABLE 2

| Resin | Modification Type | Carboxyl/Anionic Pendant Group Mole % | Viscosity cP | % D.H. |
| --- | --- | --- | --- | --- |
| PVOH-1 | Homopolymer | 0 | 23 | 88 |
| PVOH-2 | Homopolymer | 0 | 12.5 | 88 |
| PVOH-3 | Sodium AMPS | 2 | 24 | 88 |
| PVOH-4 | Methyl Acrylate Copolymer | 3.5 | 20 | 0 |
| PVOH-5 | Maleate Copolymer A | 3.5 | 23.5 | 91.5 |
| PVOH-6 | Maleate Copolymer B | 8 | 16.5 | 96 |
| PVOH-7 | Maleate Copolymer C | 8 | 14.3 | 99.6 |
| PVOH-8 | Maleate Copolymer D | 8 | 23.5 | 99.6 |

Example 1

Descriptions of films according to Examples 1-1 to 1-9 are provided in Table 3 as examples of various ranges of concentrations of anti-block filler and release modifier. The examples are provided in one type of polyvinyl alcohol copolymer resin formulation, but the ranges are applicable to alternative formulations consistent with the disclosure herein. Non-resin components are described in units of PHR.

TABLE 3

| | Example | | | | | | | | |
| --- | --- | --- | --- | --- | --- | --- | --- | --- | --- |
| | 1-1 | 1-2 | 1-3 | 1-4 | 1-5 | 1-6 | 1-7 | 1-8 | 1-9 |
| PVOH-6 Resin | 100 | 100 | 100 | 100 | 100 | 100 | 100 | 100 | 100 |
| Glycerol Plasticizer | 11.7 | 11.7 | 11.7 | 11.7 | 11.7 | 11.7 | 11.7 | 11.7 | 11.7 |
| Propylene Glycol Plasticizer | 0.4 | 0.4 | 0.4 | 0.4 | 0.4 | 0.4 | 0.4 | 0.4 | 0.4 |

TABLE 3-continued

| | Example | | | | | | | | |
|---|---|---|---|---|---|---|---|---|---|
| | 1-1 | 1-2 | 1-3 | 1-4 | 1-5 | 1-6 | 1-7 | 1-8 | 1-9 |
| Sorbitol Plasticizer | 6.7 | 6.7 | 6.7 | 6.7 | 6.7 | 6.7 | 6.7 | 6.7 | 6.7 |
| MP Diol Plasticizer | 6.7 | 6.7 | 6.7 | 6.7 | 6.7 | 6.7 | 6.7 | 6.7 | 6.7 |
| TMP Plasticizer | 0.0 | 0.0 | 0.0 | 0.0 | 0.0 | 0.0 | 0.0 | 0.0 | 0.0 |
| Modified Starch Filler | 2.7 | 2.7 | 2.7 | 2.7 | 2.7 | 2.7 | 2.7 | 2.7 | 2.7 |
| Sodium Metabisulfite Antioxidant | 0.3 | 0.3 | 0.3 | 0.3 | 0.3 | 0.3 | 0.3 | 0.3 | 0.3 |
| Surfactants | 0.6 | 0.6 | 0.6 | 0.6 | 0.6 | 0.6 | 0.6 | 0.6 | 0.6 |
| SiO$_2$ Anti-Block Filler | 0.0 | 0.0 | 2.0 | 2.0 | 1.0 | 0.5 | 0.5 | 1.5 | 1.5 |
| Stearic Acid Release Modifier | 0.0 | 2.0 | 2.0 | 0.0 | 1.0 | 0.5 | 1.5 | 1.5 | 0.5 |
| Denatonium Benzoate Bitterant | 0.1 | 0.1 | 0.1 | 0.1 | 0.1 | 0.1 | 0.1 | 0.1 | 0.1 |
| Defoamer | 0.03 | 0.03 | 0.03 | 0.03 | 0.03 | 0.03 | 0.03 | 0.03 | 0.03 |
| Total | 129.23 | 131.23 | 133.23 | 131.23 | 131.23 | 130.23 | 131.23 | 132.23 | 131.23 |

Surprising synergistic reduction in the Static COF of PVOH water soluble films were observed with blends of anti-block filler together with release modifier (chemically prepared amorphous SiO$_2$ particles blended with stearic acid, in these examples). The chemically prepared amorphous SiO$_2$ particles had a median particle size of about 6 microns, and no surface treatment. It was found that a natural mined SiO$_2$ product having the same particle size did not give the same improvement in Static COF Films having single-component doses of anti-block filler and release modifier (1-4 and 1-2, respectively) were tested for their Static COF, together with a film having no having no anti-block filler or release modifier, for comparison (film 1-1). 2 PHR of film having no anti-block filler (1-1). The film having neither component exhibited a Static COF of 8.91; the film having 2 PHR anti-block filler had a Static COF of 0.44; and the film having 2 PHR release modifier had a Static COF of 2.39.

The contribution of the anti-block filler (SiO$_2$ in this example) and release modifier (stearic acid in this example) to the reduction in Static COF by themselves can be calculated based on the Rule-of-Mixture and weight fraction contribution to the reduction in Static COF, as shown in Equation [3] below for SiO$_2$, wherein $P_{FF}$ is the parts by weight of film former and $P_{SiO2}$ is the parts by weight of SiO$_2$ in this example.

$$COF = P_{FF} \times 0.0819 + P_{SiO2} \times SiO_2 \quad [3]$$

By this method, the coefficient for contribution of SiO$_2$ was found to be 3.875. Similarly, the coefficient for contribution of stearic acid to reduction in Static COF was found to be 2.90.

Therefore, based on the Rule-of-Mixtures, the equation for prediction of Static COF can be written as in Equation [4] below:

$$COF = P_{FF} \times 0.0819 - 3.875 P_{SiO2} - 2.90 P_{Stearic\ Acid} \quad [4]$$

Table 4 shows the design-of-mixtures proportions of anti-block filler (SiO$_2$ in these examples) and release modifier (stearic acid in these examples) in the films tested (in PHR) and the predicted Static COF according to Equation [4]

TABLE 4

Film ID: SiO2 (PHR)/Stearic Acid (PHR)
Predicted Static COF

| | | 1-1: 0/0 — | | |
| | | 1-6: 0.5/0.5 4.80 | | |
| 1-4: 2.0/0 — | 1-9: 1.5/0.5 0.93 | 1-5: 1.0/1.0 1.42 | 1-7: 0.5/1.5 1.90 | 1-2: 0/2.0 — |
| | | 1-8: 1.5/1.5 — | | |
| | | 1-3: 2.0/2.0 — | | |

Table 5 shows the design-of-mixtures proportions of anti-block filler (SiO$_2$ in these examples) and release modifier (stearic acid in these examples) in the films tested (in PHR) and the measured Static COF values for mixtures up to 2 PHR total for comparison with predicted values, as well as additional measured values for 1:1 mixtures above 2 PHR total concentration of anti-block filler and release modifier.

TABLE 5

Film ID: SiO$_2$ (PHR)/Stearic Acid (PHR)
Measured Static COF

| | | 1-1: 0/0 8.19 | | |
| | | 1-6: 0.5/0.5 0.43 | | |
| 1-4: 2.0/0 0.44 | 1-9: 1.5/0.5 0.32 | 1-5: 1.0/1.0 0.34 | 1-7: 0.5/1.5 0.35 | 1-2: 0/2.0 2.39 |
| | | 1-8: 1.5/1.5 0.3 | | |
| | | 1-3: 2.0/2.0 0.24 | | |

The results in Table 5, compared to the predicted values in Table 4, demonstrate a surprising synergistic reduction in the Static COF of water soluble films with blends of anti-block filler and release modifier (chemically prepared amorphous SiO$_2$ and stearic acid, in these examples).

Figure 6:
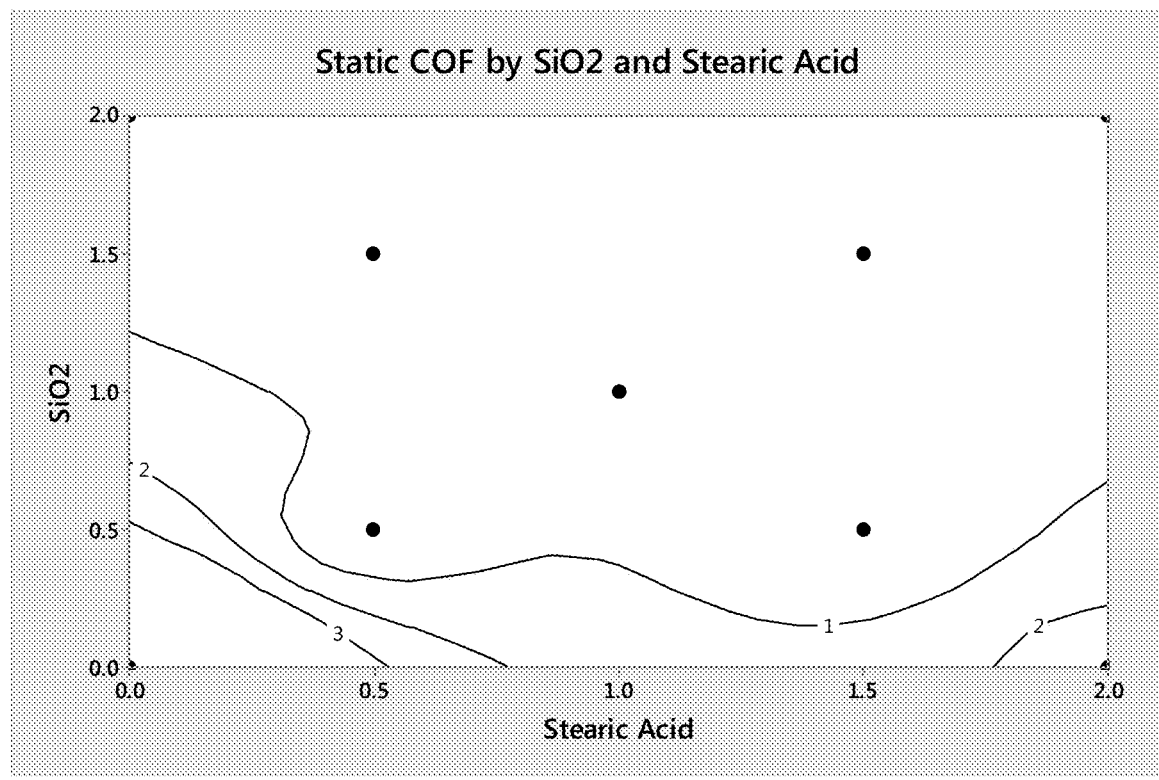
FIG. 6 shows response surface plot (contour plot) for mixtures of $SiO_2$ and stearic acid in the films of Example 1.

A response surface plot (contour plot) for mixtures of SiO$_2$ and stearic acid was modeled based the data using MINITAB 17 statistical analysis software (Minitab, Inc., State College, Pa., USA). The resulting plot is provided as FIG. 6 herewith, and illustrates regions of anti-block and release modifier mixtures that can provide desired low values of Static COF in films.

It was further found that films 1-3 through 1-9 showed a provided combination of physical properties described by Static COF less than 0.45, tensile strength in a range of 40 to 60 MPa, and tear strength in a range of 1000 to 2100 g/mil. Still further, films 1-4 through 1-9 provided a preferred combination of physical properties described by Static COF less than 0.45, tensile strength in a range of 40 to 60 MPa, and tear strength in a range of 1150 to 2100 g/mil.

Example 2

Films according to Examples 2-1 to 2-6 are provided in Table 6 as examples of various ranges of PVOH comonomer type and pendant group inclusion level. The examples are provided in one type of additive formulation across the range of resins, but the various resins are applicable to alternative formulations consistent with the disclosure herein. Non-resin components are described in units of PHR.

TABLE 6

|  | Example | | | | | |
| --- | --- | --- | --- | --- | --- | --- |
|  | 2-1 | 2-2 | 2-3 | 2-4 | 2-5 | 2-6 |
| Resin | 100 | 100 | 100 | 100 | 100 | 100 |
| Resin Type | PVOH-1 | PVOH-2 | PVOH-3 | PVOH-5 | PVOH-6 | PVOH-4 |
| Glycerol Plasticizer | 7.1 | 7.1 | 7.1 | 7.1 | 7.1 | 7.1 |
| Propylene Glycol Plasticizer | 0.4 | 0.4 | 0.4 | 0.4 | 0.4 | 0.4 |
| Sorbitol Plasticizer | 3.3 | 3.3 | 3.3 | 3.3 | 3.3 | 3.3 |
| MP Diol Plasticizer | 14.6 | 14.6 | 14.6 | 14.6 | 14.6 | 14.6 |
| TMP Plasticizer | 0.0 | 0.0 | 0.0 | 0.0 | 0.0 | 0.0 |
| Modified Starch Filler | 2.7 | 2.7 | 2.7 | 2.7 | 2.7 | 2.7 |
| Sodium Metabisulfite Antioxidant | 0.3 | 0.3 | 0.3 | 0.3 | 0.3 | 0.3 |
| Surfactants | 0.6 | 0.6 | 0.6 | 0.6 | 0.6 | 0.6 |
| $SiO_2$ Anti-Block Filler | 0.7 | 0.7 | 0.7 | 0.7 | 0.7 | 0.7 |
| Stearic Acid Release Modifier | 0.7 | 0.7 | 0.7 | 0.7 | 0.7 | 0.7 |
| Denatonium Benzoate Bitterant | 0.1 | 0.1 | 0.1 | 0.1 | 0.1 | 0.1 |
| Defoamer | 0.03 | 0.03 | 0.03 | 0.03 | 0.03 | 0.03 |
| Total | 130.53 | 130.53 | 130.53 | 130.53 | 130.53 | 130.53 |

Films 2-1 through 2-6 were evaluated for residue by the Dissolution Chamber Test (5 min). Film 2-5 (which included Maleate Copolymer B, see Table 2) exhibited a surprising reduction in residue, compared to the films made with other types of resins. Results are shown in Table 7 below.

TABLE 7

| Film | n | Mean DC (5 min) residue value (sec) |
| --- | --- | --- |
| 2-1 | 3 | 74.80 |
| 2-2 | 3 | 68.43 |
| 2-4 | 3 | 62.29 |
| 2-3 | 3 | 60.39 |
| 2-6 | 3 | 50.34 |
| 2-5 | 3 | 37.47 |

Figure 7:
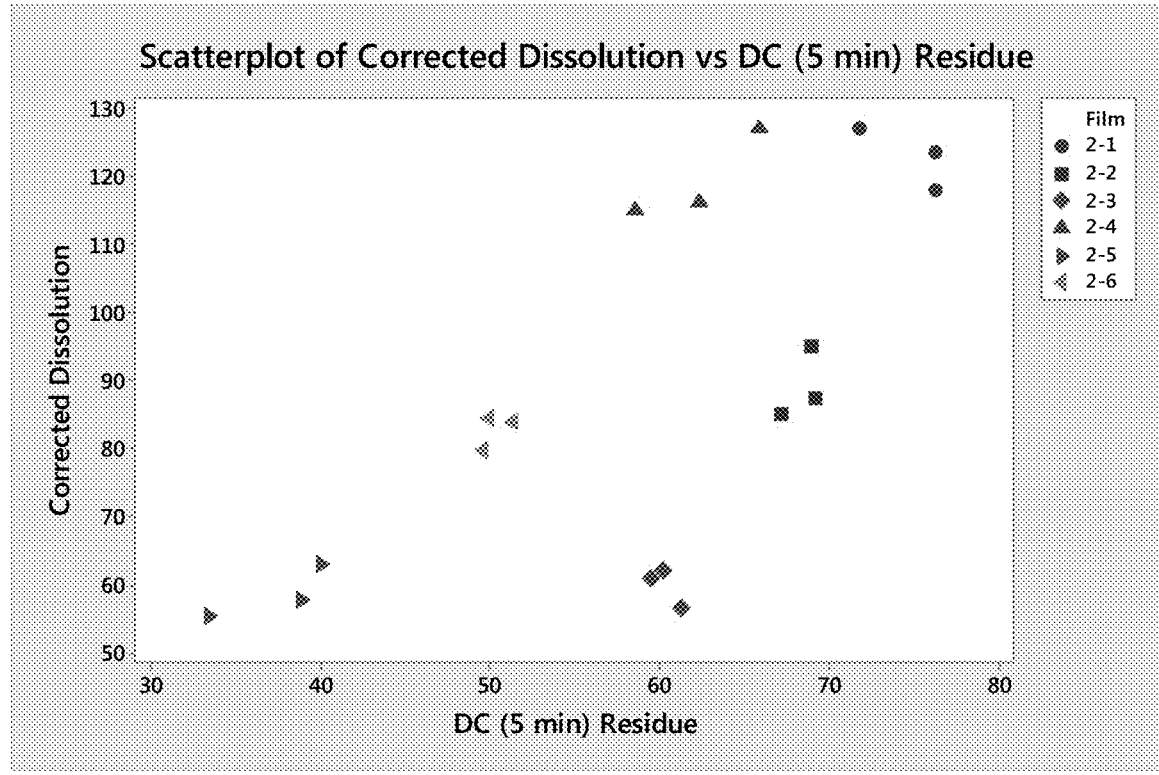
FIG. 7 shows a scatterplot of Corrected Dissolution Times versus DC (5 min) residues for the films of Example 2.

The results of Dissolution Chamber testing for residue do not necessarily correlate with Corrected Dissolution Time results. The Dissolution Time test measures film dissolving under dynamic stress (moving water) while the Dissolution Chamber Test measures film dissolving under static conditions and is diffusion driven. FIG. 7 shows that only Film 2-5 (based on Maleate Copolymer B) has both low Corrected Dissolution Time and simultaneously a low residue value based on Dissolution Chamber testing. As explained above in connection with the Dissolution Chamber Test methodology, this combination of results is particularly useful because it is representative of different real-world conditions of film dissolution which can be encountered in laundry applications.

Thus, in another contemplated embodiment, the film includes a plasticizer blend including glycerol, sorbitol, and 2-methyl-1,3-propanediol, and a maleate polyvinyl alcohol copolymer having a carboxyl pendant group modification degree in a range of 6 mol % to 10 mol %, or 7 mol % to 9 mol %, and a viscosity in a range of 10.5 cP to 22.5 cP, or 12.5 cP to about 22.5 cP, or about 15 cP to about 20 cP and a degree of hydrolysis in a range of about 80% to 99% or 85% to 95%, for example consistent with PVOH-6 described herein.

In various applications, while Dissolution Time can be important, it may not be as critical as the concern for higher residue (DC (5 min) residue). Therefore the combination of moderately fast Dissolution Time with low DC (5 min) reside in Film 2-6 is also highly favorable. It even may be, in some situations, even more desirable than Film 2-5, e.g. where an initial resistance to dissolving may be desired but later easy and more complete dissolution in static water is desirable. Thus, in another contemplated embodiment, the film includes a plasticizer blend including glycerol, sorbitol, and 2-methyl-1,3-propanediol, and a methyl acrylate polyvinyl alcohol copolymer resin having a degree of modification of about 4.0 mol % to about 6 mol %, or about 4.5 mol % to 5.5 mol %, and a viscosity of in a range of about 10 cP to 30 cP, or about 15 cP to about 25 cP, or about 17 cP to about 23 cP, and a degree of hydrolysis in a range of about 98.0 to about 99.8, or about 99 to about 99.8, for example consistent with PVOH-4 described herein.

Example 3

Films according to Examples 3-1 to 3-21 are provided in Table 8 and Table 9 as examples of various ranges of plasticizer type and concentration for the combination of glycerol, sorbitol, and MPD with a small amount of propylene glycol. The examples are provided in one type of polyvinyl alcohol copolymer resin formulation with other additives, but the various plasticizer formulations are applicable to alternative film formulations consistent with the disclosure herein. For example, it is contemplated that the plasticizer levels are applicable to anionic polyvinyl alcohol copolymers. Non-resin components are described in units of PHR.

TABLE 8

| | \multicolumn{11}{c}{Example} | | | | | | | | | | |
|---|---|---|---|---|---|---|---|---|---|---|---|
| | 3-1 | 3-2 | 3-3 | 3-4 | 3-5 | 3-6 | 3-7 | 3-8 | 3-9 | 3-10 | 3-11 |
| PVOH-6 Resin | 100 | 100 | 100 | 100 | 100 | 100 | 100 | 100 | 100 | 100 | 100 |
| Glycerol Plasticizer | 4.0 | 9.0 | 4.0 | 5.7 | 4.8 | 7.4 | 4.8 | 5.0 | 11.3 | 5.0 | 7.1 |
| Propylene Glycol Plasticizer | 0.4 | 0.4 | 0.4 | 0.4 | 0.4 | 0.4 | 0.4 | 0.4 | 0.4 | 0.4 | 0.4 |
| Sorbitol Plasticizer | 1.0 | 1.0 | 6.0 | 2.7 | 1.8 | 1.8 | 4.3 | 1.2 | 1.2 | 7.5 | 3.3 |
| MP Diol Plasticizer | 15.0 | 10.0 | 10.0 | 11.6 | 13.4 | 10.8 | 10.9 | 18.8 | 12.5 | 12.5 | 14.6 |
| TMP Plasticizer | 0.0 | 0.0 | 0.0 | 0.0 | 0.0 | 0.0 | 0.0 | 0.0 | 0.0 | 0.0 | 0.0 |
| Modified Starch Filler | 2.7 | 2.7 | 2.7 | 2.7 | 2.7 | 2.7 | 2.7 | 2.7 | 2.7 | 2.7 | 2.7 |
| Sodium Metabisulfite Antioxidant | 0.3 | 0.3 | 0.3 | 0.3 | 0.3 | 0.3 | 0.3 | 0.3 | 0.3 | 0.3 | 0.3 |
| Surfactants | 0.6 | 0.6 | 0.6 | 0.6 | 0.6 | 0.6 | 0.6 | 0.6 | 0.6 | 0.6 | 0.6 |
| $SiO_2$ Anti-Block Filler | 0.7 | 0.7 | 0.7 | 0.7 | 0.7 | 0.7 | 0.7 | 0.7 | 0.7 | 0.7 | 0.7 |
| Stearic Acid Release Modifier | 0.7 | 0.7 | 0.7 | 0.7 | 0.7 | 0.7 | 0.7 | 0.7 | 0.7 | 0.7 | 0.7 |
| Denatonium Benzoate Bitterant | 0.1 | 0.1 | 0.1 | 0.1 | 0.1 | 0.1 | 0.1 | 0.1 | 0.1 | 0.1 | 0.1 |
| Defoamer | 0.03 | 0.03 | 0.03 | 0.03 | 0.03 | 0.03 | 0.03 | 0.03 | 0.03 | 0.03 | 0.03 |
| Total | 125.53 | 125.53 | 125.53 | 125.53 | 125.53 | 125.53 | 125.53 | 130.53 | 130.53 | 130.53 | 130.53 |

TABLE 9

| | \multicolumn{10}{c}{Example} | | | | | | | | | |
|---|---|---|---|---|---|---|---|---|---|---|
| | 3-12 | 3-13 | 3-14 | 3-15 | 3-16 | 3-17 | 3-18 | 3-19 | 3-20 | 3-21 |
| PVOH-6 Resin | 100 | 100 | 100 | 100 | 100 | 100 | 100 | 100 | 100 | 100 |
| Glycerol Plasticizer | 6.0 | 9.2 | 6.1 | 6.0 | 13.5 | 6.0 | 8.5 | 7.2 | 11.0 | 7.3 |
| Propylene Glycol Plasticizer | 0.4 | 0.4 | 0.4 | 0.4 | 0.4 | 0.4 | 0.4 | 0.4 | 0.4 | 0.4 |
| Sorbitol Plasticizer | 2.3 | 2.3 | 5.4 | 1.5 | 1.5 | 9.0 | 4.0 | 2.8 | 2.8 | 6.5 |
| MP Diol Plasticizer | 16.7 | 13.5 | 13.5 | 22.5 | 15.0 | 15.0 | 17.5 | 20.0 | 16.3 | 16.3 |
| TMP Plasticizer | 0.0 | 0.0 | 0.0 | 0.0 | 0.0 | 0.0 | 0.0 | 0.0 | 0.0 | 0.0 |
| Modified Starch Filler | 2.7 | 2.7 | 2.7 | 2.7 | 2.7 | 2.7 | 2.7 | 2.7 | 2.7 | 2.7 |
| Sodium Metabisulfite Antioxidant | 0.3 | 0.3 | 0.3 | 0.3 | 0.3 | 0.3 | 0.3 | 0.3 | 0.3 | 0.3 |
| Surfactants | 0.6 | 0.6 | 0.6 | 0.6 | 0.6 | 0.6 | 0.6 | 0.6 | 0.6 | 0.6 |
| $SiO_2$ Anti-Block Filler | 0.7 | 0.7 | 0.7 | 0.7 | 0.7 | 0.7 | 0.7 | 0.7 | 0.7 | 0.7 |
| Stearic Acid Release Modifier | 0.7 | 0.7 | 0.7 | 0.7 | 0.7 | 0.7 | 0.7 | 0.7 | 0.7 | 0.7 |
| Denatonium Benzoate Bitterant | 0.1 | 0.1 | 0.1 | 0.1 | 0.1 | 0.1 | 0.1 | 0.1 | 0.1 | 0.1 |
| Defoamer | 0.03 | 0.03 | 0.03 | 0.03 | 0.03 | 0.03 | 0.03 | 0.03 | 0.03 | 0.03 |
| Total | 130.53 | 130.53 | 130.53 | 135.53 | 135.53 | 135.53 | 135.53 | 135.53 | 135.63 | 135.63 |

Figure 8:
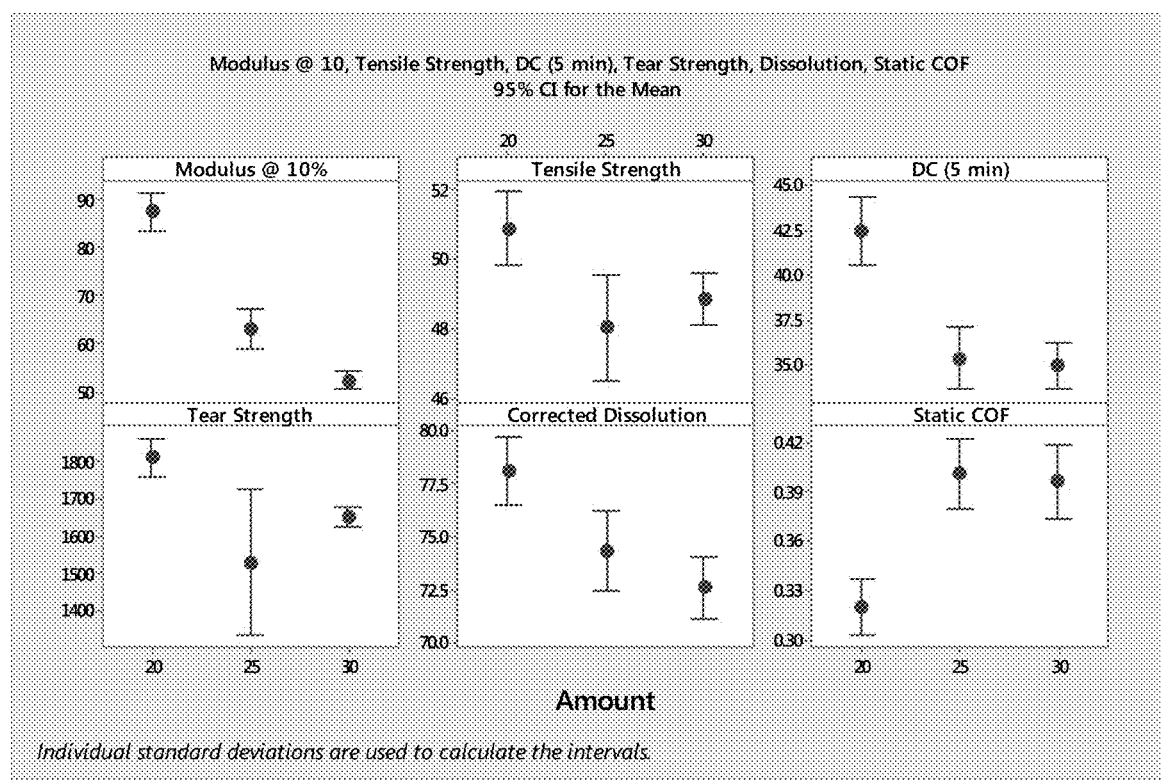
FIG. 8 shows plots of Modulus at 10% (N/mm$^2$), Tensile Strength (MPa), DC (5 min) residue in %, Tear Strength (g/mil), Corrected Dissolution Time (3 mil, units of seconds), and Static COF for the films of Example 3.

FIG. 8 shows plots of Modulus at 10% (N/mm$^2$), Tensile Strength (MPa), DC (5 min) residue in %, Tear Strength (g/mil), Corrected Dissolution Time (3 mil, units of seconds), and Static COF for Films 3-1 through 3-21, grouped by the total amount of plasticizer blend (glycerol/sorbitol/MPD) in PHR (i.e., 20 PHR, 25 PHR, and 30 PHR).

Modulus and Dissolution continuously decrease with increasing levels of plasticizer. Tensile Strength, DC (5 min) residue, and Tear Strength decrease from Total PHR=20 to 25 and 30 and then essentially level off. In contrast, Static COF increases from Total PHR=20 to 25 and 30; however, at all levels of this plasticizer system the COF levels remain well below 1, which is a favorable result. Furthermore, at all levels of this plasticizer system the Tear Strength is high.

A surprising result is that in this system above 25 PHR total plasticizer content, the dissolution characteristics (Corrected Dissolution Time, and to some extent DC (5 min) residue) and Modulus at 10% can continue to be lowered with increasing plasticizer content, without negatively affecting Tensile Strength and Tear Strength.

The results were further evaluated using MINITAB 17 statistical analysis software using a Design of Mixture Experiment setup using Multiple Simplex Design in Amounts, and setting total plasticizer blend (glycerol/sorbitol/MPD, aka GSM) levels at 20 PHR, 25 PHR, and 30 PHR.

The model fit by the MINITAB software provided regions of plasticizer combinations and levels to give a preferred set of physical film characteristics of:
(1) modulus at 10%<90 N/mm$^2$;
(2) DC (5 min) residue<45 wt. %
(3) Tear Strength>1000 g/mil
(4) Tensile Strength>45 MPa
(5) Corrected Dissolution Time$_{3\ mil}$<90 seconds; and
(6) Static COF<1.

In one type of embodiment, a preferred combination is described by the total plasticizer blend (GSM) of 20 PHR and individual components (all parts PHR):
6.0<Glycerol<13.5
1.0<Sorbitol<5.0
10.0<MPD<15.0.

In another type of embodiment, a preferred combination is described by total plasticizer blend (GSM) of 25 PHR and individual components (all parts PHR):
5.0<Glycerol<11.3
1.25<Sorbitol<7.5
12.5<MPD<18.8.

In another type of embodiment, a preferred combination is described by total plasticizer blend (GSM) of 30 PHR and individual components (all parts PHR):
6.0<Glycerol<13.5
1.5<Sorbitol<9.0
15<MPD<22.5.

The model fit by the MINITAB software also provided regions of plasticizer combinations and levels to give a more preferred set of physical film characteristics of:
(1) modulus at 10%<80 N/mm$^2$;
(2) DC (5 min) residue<35 wt. %
(3) Tear Strength>1000 g/mil
(4) Tensile Strength>35 MPa
(5) Corrected Dissolution Time$_{3\ mil}$<80 seconds; and
(6) Static COF<1.

In one type of this embodiment, a preferred combination is described by total plasticizer blend (GSM) of 30 PHR and individual components (all parts PHR):
6.0<Glycerol<13.5
1.5<Sorbitol<9.0
15.0<MPD<22.5.

The model fit by the MINITAB software also provided regions of plasticizer combinations and levels to give a more preferred set of physical film characteristics of:
(1) modulus at 10%<80 N/mm$^2$;
(2) DC (5 min) residue<35 wt. %
(3) Tear Strength>1700 g/mil
(4) Tensile Strength>35 MPa
(5) Corrected Dissolution Time$_{3\ mil}$<80 seconds; and
(6) Static COF<1.

In one type of this embodiment, a preferred combination is described by total plasticizer blend (GSM) of 30 PHR and individual components (all parts PHR):
7.6<Glycerol<11.8.5
2.2<Sorbitol<7.3
15.0<MPD<18.5.

Example 4

Films according to Examples 4-1 to 4-18 are provided in Table 10 and Table 11 as examples of various ranges of plasticizer type and concentration for the combination of glycerol, sorbitol, and TMP with a small amount of propylene glycol. The examples are provided in one type of polyvinyl alcohol copolymer resin formulation with other additives, but the various plasticizer formulations are applicable to alternative film formulations consistent with the disclosure herein. For example, it is contemplated that the plasticizer levels are applicable to anionic polyvinyl alcohol copolymers. Non-resin components are described in units of PHR.

TABLE 10

| | Example | | | | | | | | |
|---|---|---|---|---|---|---|---|---|---|
| | 4-1 | 4-2 | 4-3 | 4-4 | 4-5 | 4-6 | 4-7 | 4-8 | 4-9 |
| PVOH-5 Resin | 100 | 100 | 100 | 100 | 100 | 100 | 100 | 100 | 100 |
| Glycerol Plasticizer | 20.0 | 15.0 | 15.0 | 16.7 | 18.8 | 18.8 | 25.0 | 20.8 | 18.8 |
| Propylene Glycol Plasticizer | 0.4 | 0.4 | 0.4 | 0.4 | 0.4 | 0.4 | 0.4 | 0.4 | 0.4 |
| Sorbitol Plasticizer | 5.0 | 5.0 | 10.0 | 6.7 | 12.5 | 6.3 | 6.3 | 8.3 | 9.4 |
| MP Diol Plasticizer | 0.0 | 0.0 | 0.0 | 0.0 | 0.0 | 0.0 | 0.0 | 0.0 | 0.0 |
| TMP Plasticizer | 5.0 | 10.0 | 5.0 | 6.7 | 6.3 | 12.5 | 6.3 | 8.3 | 9.4 |
| Modified Starch Filler | 2.7 | 2.7 | 2.7 | 2.7 | 2.7 | 2.7 | 2.7 | 2.7 | 2.7 |
| Sodium Metabisulfite Antioxidant | 0.3 | 0.3 | 0.3 | 0.3 | 0.3 | 0.3 | 0.3 | 0.3 | 0.3 |
| Surfactants | 0.6 | 0.6 | 0.6 | 0.6 | 0.6 | 0.6 | 0.6 | 0.6 | 0.6 |
| SiO$_2$ Anti-Block Filler | 0.7 | 0.7 | 0.7 | 0.7 | 0.7 | 0.7 | 0.7 | 0.7 | 0.7 |
| Stearic Acid Release Modifier | 0.7 | 0.7 | 0.7 | 0.7 | 0.7 | 0.7 | 0.7 | 0.7 | 0.7 |
| Denatonium Benzoate Bitterant | 0.1 | 0.1 | 0.1 | 0.1 | 0.1 | 0.1 | 0.1 | 0.1 | 0.1 |
| Defoamer | 0.03 | 0.03 | 0.03 | 0.03 | 0.03 | 0.03 | 0.03 | 0.03 | 0.03 |
| Total | 135.53 | 135.53 | 135.53 | 135.63 | 143.13 | 143.13 | 143.13 | 142.93 | 143.13 |

TABLE 11

| | Example | | | | | | | | |
|---|---|---|---|---|---|---|---|---|---|
| | 4-10 | 4-11 | 4-12 | 4-13 | 4-14 | 4-15 | 4-16 | 4-17 | 4-18 |
| PVOH-5 Resin | 100 | 100 | 100 | 100 | 100 | 100 | 100 | 100 | 100 |
| Glycerol Plasticizer | 21.9 | 21.9 | 19.8 | 22.9 | 19.8 | 22.5 | 30.0 | 22.5 | 25.0 |
| Propylene Glycol Plasticizer | 0.4 | 0.4 | 0.4 | 0.4 | 0.4 | 0.4 | 0.4 | 0.4 | 0.4 |
| Sorbitol Plasticizer | 6.3 | 9.4 | 7.3 | 7.3 | 10.4 | 7.5 | 7.5 | 15.0 | 10.0 |
| MP Diol Plasticizer | 0.0 | 0.0 | 0.0 | 0.0 | 0.0 | 0.0 | 0.0 | 0.0 | 0.0 |
| TMP Plasticizer | 9.4 | 6.3 | 10.4 | 7.3 | 7.3 | 15.0 | 7.5 | 7.5 | 10.0 |
| Modified Starch Filler | 2.7 | 2.7 | 2.7 | 2.7 | 2.7 | 2.7 | 2.7 | 2.7 | 2.7 |

TABLE 11-continued

| | Example | | | | | | | | |
|---|---|---|---|---|---|---|---|---|---|
| | 4-10 | 4-11 | 4-12 | 4-13 | 4-14 | 4-15 | 4-16 | 4-17 | 4-18 |
| Sodium Metabisulfite Antioxidant | 0.3 | 0.3 | 0.3 | 0.3 | 0.3 | 0.3 | 0.3 | 0.3 | 0.3 |
| Surfactants | 0.6 | 0.6 | 0.6 | 0.6 | 0.6 | 0.6 | 0.6 | 0.6 | 0.6 |
| SiO$_2$ Anti-Block Filler | 0.7 | 0.7 | 0.7 | 0.7 | 0.7 | 0.7 | 0.7 | 0.7 | 0.7 |
| Stearic Acid Release Modifier | 0.7 | 0.7 | 0.7 | 0.7 | 0.7 | 0.7 | 0.7 | 0.7 | 0.7 |
| Denatonium Benzoate Bitterant | 0.1 | 0.1 | 0.1 | 0.1 | 0.1 | 0.1 | 0.1 | 0.1 | 0.1 |
| Defoamer | 0.03 | 0.03 | 0.03 | 0.03 | 0.03 | 0.03 | 0.03 | 0.03 | 0.03 |
| Total | 143.13 | 143.13 | 143.03 | 143.03 | 143.03 | 150.53 | 150.53 | 150.53 | 150.53 |

Figure 9:
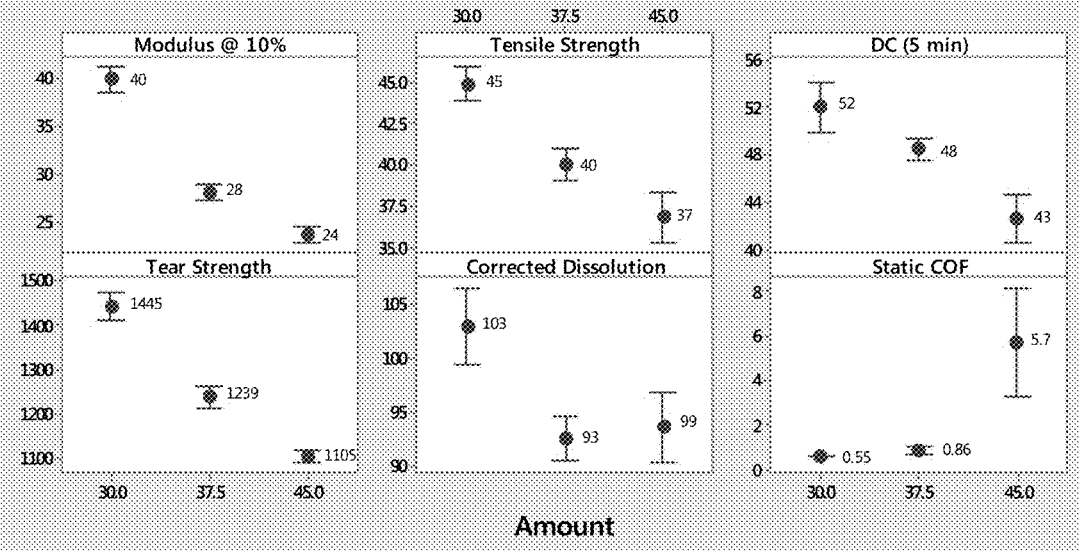
FIG. 9 shows plots of Modulus at 10% (N/mm$^2$), Tensile Strength (MPa), DC (5 min) residue in %, Tear Strength (g/mil), Corrected Dissolution Time (3 mil, units of seconds), and Static COF for the films of Example 4.

FIG. 9 shows plots of Modulus at 10% (N/mm$^2$), Tensile Strength (MPa), DC (5 min) residue in %, Tear Strength (g/mil), Corrected Dissolution Time (3 mil, units of seconds), and Static COF for Films 4-1 through 4-18, grouped by the total amount of plasticizer blend (glyerine/sorbitol/TMP, aka GST) in PHR (i.e., 30 PHR, 37.5 PHR, and 45 PHR).

Overall, lower Modulus at 10% values are observed for this series than for the series with GSM plastizicer blends in Example 3. To a certain extent this is not surprising since the plasticizer blend PHR loadings topped out at 30 PHR for the series of Example 3, while this set started at 30 PHR and topped out at 45 PHR. The lower Modulus at 10% may be of particular benefit for greater thermoformability for deep draw cavities.

FIG. 9 clearly shows that Modulus @ 10%, Tensile Strength, DC (5 min) residue and Tear Strength are correlated for this type of blend. All four of these have decreasing values with increasing levels of the total loading of plasticizer blend. However, higher Tensile Strength and Tear Strength are preferred while in contrast lower DC (5 min) and Modulus @ 10% are preferred.

In contrast to the four properties described above it is notable that Corrected Dissolution Times and Static COF do not smoothly increase or decrease with increasing total plasticizer blend loading. Specifically, Corrected Dissolution Times decrease from the range of about 30 to abut 37.5 PHR but plateaus from about 37.5 to about 45.0 PHR, while Static COF starts at a relative plateau for 30.0 and 37.5 PHR total loading and then dramatically increases for the 45.0 PHR loading.

The results show that with TMP in the plasticizer blend the Tensile Strengths of the films is relatively high, and higher loadings of total plasticizer content can be used, resulting in better dissolution characteristics and lowering of Modulus at 10%, up to a point when the Static COF increases dramatically (e.g. around 45 PHR in these examples). Film formulations having a total plasticizer blend GST loading of in a range around 37.5 PHR are particularly preferred, as they exhibit favorably lower Modulus at 10%, favorably lower DC (5 min) residue, favorably higher Tear Strength, favorably higher Tensile Strength, favorably lower Corrected Dissolution Time, and favorably lower Static COF.

The results were further evaluated using MINITAB 17 statistical analysis software using a Design of Mixture Experiment setup using Multiple Simplex Design in Amounts, and setting total plasticizer blend (GST) levels at 30 PHR, 37.5 PHR, and 45 PHR.

The model fit by the MINITAB software provided regions of plasticizer combinations and levels to give a preferred set of physical film characteristics of:
(1) modulus at 10%<30 N/mm$^2$;
(2) DC (5 min) residue<50 wt. %
(3) Tear Strength>1000 g/mil
(4) Tensile Strength>35 MPa
(5) Corrected Dissolution Time$_{3\ mil}$<100 seconds; and
(6) Static COF<1.

In one type of embodiment, a preferred combination is described by total plasticizer blend (GST) of 37.5 PHR and individual components (all parts PHR):
19.5<Glycerol<22.5
6.7<Sorbitol<11.7
6.3<TMP<9.5.

In another one type of embodiment, a preferred combination is described by total plasticizer blend (GST) of 45 PHR and individual components (all parts PHR):
22.5<Glycerol<23.3
10.3<Sorbitol<15.0
7.5<TMP<10.2.

The model fit by the MINITAB software provided regions of plasticizer combinations and levels to give a more preferred set of physical film characteristics of:
(1) modulus at 10%<30 N/mm$^2$;
(2) DC (5 min) residue<50 wt. %
(3) Tear Strength>1000 g/mil
(4) Tensile Strength>35 MPa
(5) Corrected Dissolution Time$_{3\ mil}$<95 seconds; and
(6) Static COF<1.

In one type of this embodiment, a preferred combination is described by total plasticizer blend (GST) of 37.5 PHR and individual components (all parts PHR):
19.5<Glycerol<22.5
7.6<Sorbitol<11.7
6.3<TMP<7.5.

In another type of this embodiment, a preferred combination is described by total plasticizer blend (GST) of 45 PHR and individual components (all parts PHR):
22.5<Glycerol<23.3
13.0<Sorbitol<15.0
7.5<TMP<9.0.

Example 5

Films according to Examples 5-1 to 5-3 are provided in Table 12 as examples of alternative resin formulations in film formulations similar to examples 3-11, 3-11, and 4-8, respectively. Non-resin components are described in units of PHR.

TABLE 12

| Example | 5-1 | 5-2 | 5-3 |
|---|---|---|---|
| Resin | 100 | 100 | 100 |
| Resin Type | PVOH-5 | PVOH-5 | PVOH-6 |
| Glycerol Plasticizer | 7.1 | 6.7 | 20.8 |
| Propylene Glycol Plasticizer | 0.4 | 0.4 | 0.4 |
| Sorbitol Plasticizer | 3.3 | 4.4 | 8.3 |
| MP Diol Plasticizer | 14.6 | 12.9 | 0.0 |
| TMP Plasticizer | 0.0 | 0.0 | 8.3 |
| Modified Starch Filler | 2.7 | 2.7 | 2.7 |
| Sodium Metabisulfite Antioxidant | 0.3 | 0.3 | 0.3 |
| Surfactants | 0.6 | 0.6 | 0.6 |
| SiO$_2$ Anti-Block Filler | 0.7 | 0.7 | 0.7 |
| Stearic Acid Release Modifier | 0.7 | 0.7 | 0.7 |
| Denatonium Benzoate Bitterant | 0.1 | 0.1 | 0.1 |
| Defoamer | 0.03 | 0.03 | 0.03 |
| Total | 130.53 | 129.53 | 142.93 |

Example 6

Comparison of the data from Examples 3 and 4 show that the DC (5 min) reside is lower in the MPD series compared to the TMP series. Specifically, at equivalent 30 PHR blend loading levels the use of MPD gives substantially improved DC (5 min) residue values.

Figure 10:
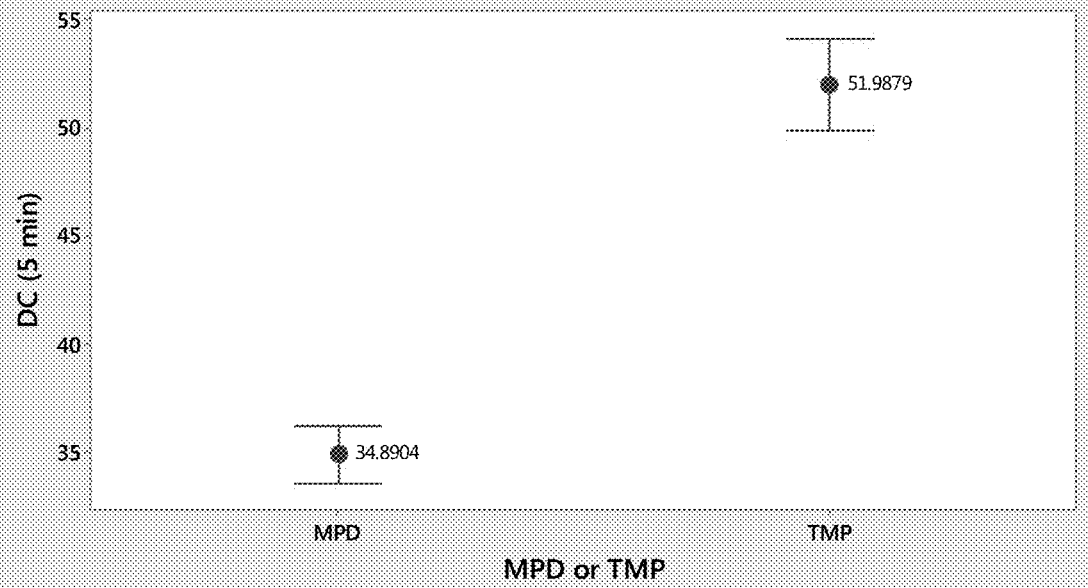
FIG. 10 shows a comparison of DC (5 min) residue performance for Example 3 (MPD) films with Example 4 (TMP) films at a constant PHR level of plasticizer blend (GSM or GST).

Comparison of DC (5 min) residue performance for Example 3 (MPD) films with Example 4 (TMP) films at a constant PHR level of plasticizer blend (GSM or GST) shows surprising improvement in DC (5 min) residue when MPD is used in preference over TMP. Surprisingly, the combination of glycerol, sorbitol and MPD DC (5 min) residue value is 27 percentage points lower than the combination of glycerol, sorbitol and TMP DC (5 min) residue (35 versus 52, respectively). See FIG. 10.

Figure 11:
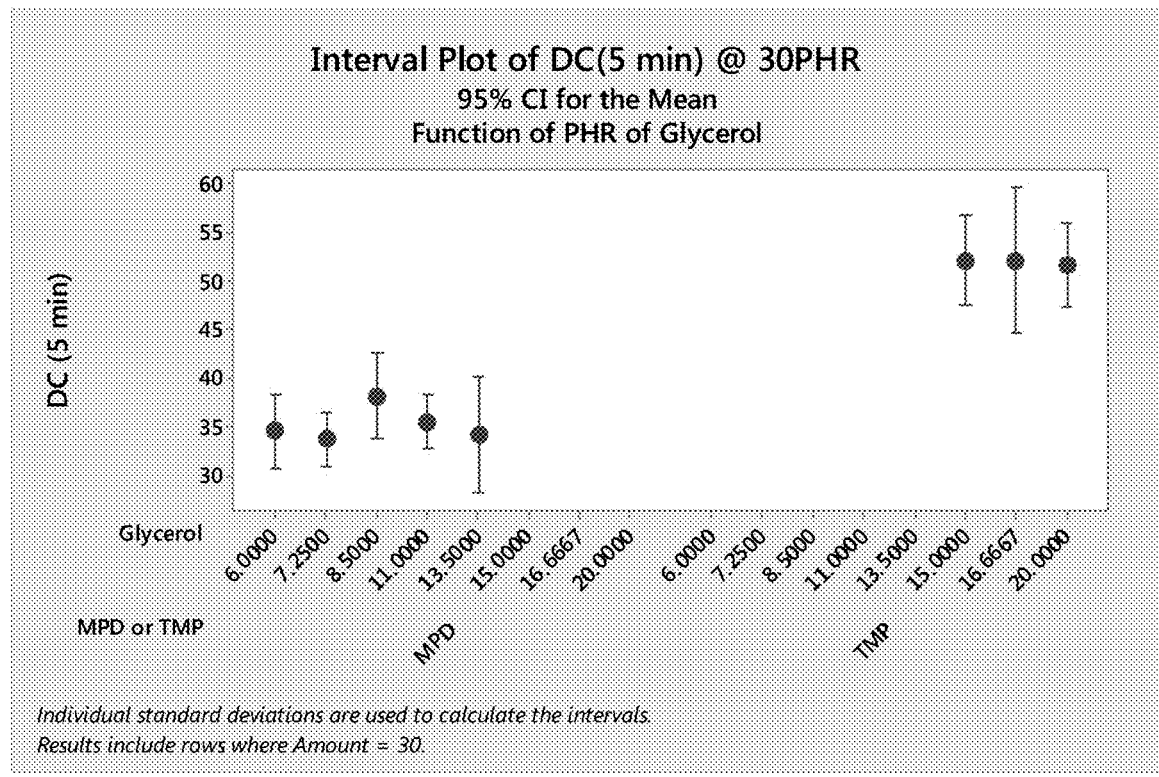
FIG. 11 shows an interval plot of DC (5 Min) residue as a function of glycerol PHR in the films of Examples 3 and 4.
Figure 12:
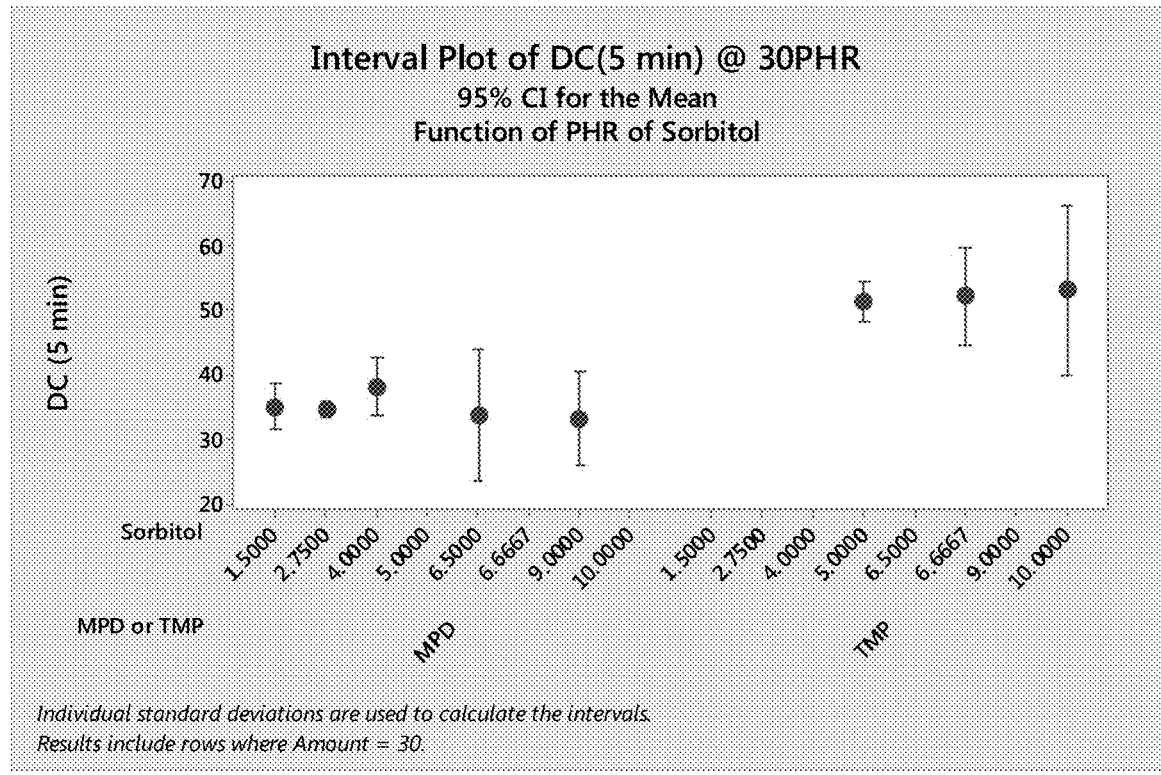
FIG. 12 shows an interval plot of DC (5 Min) residue as a function of sorbitol PHR in the films of Examples 3 and 4.
Figure 13:
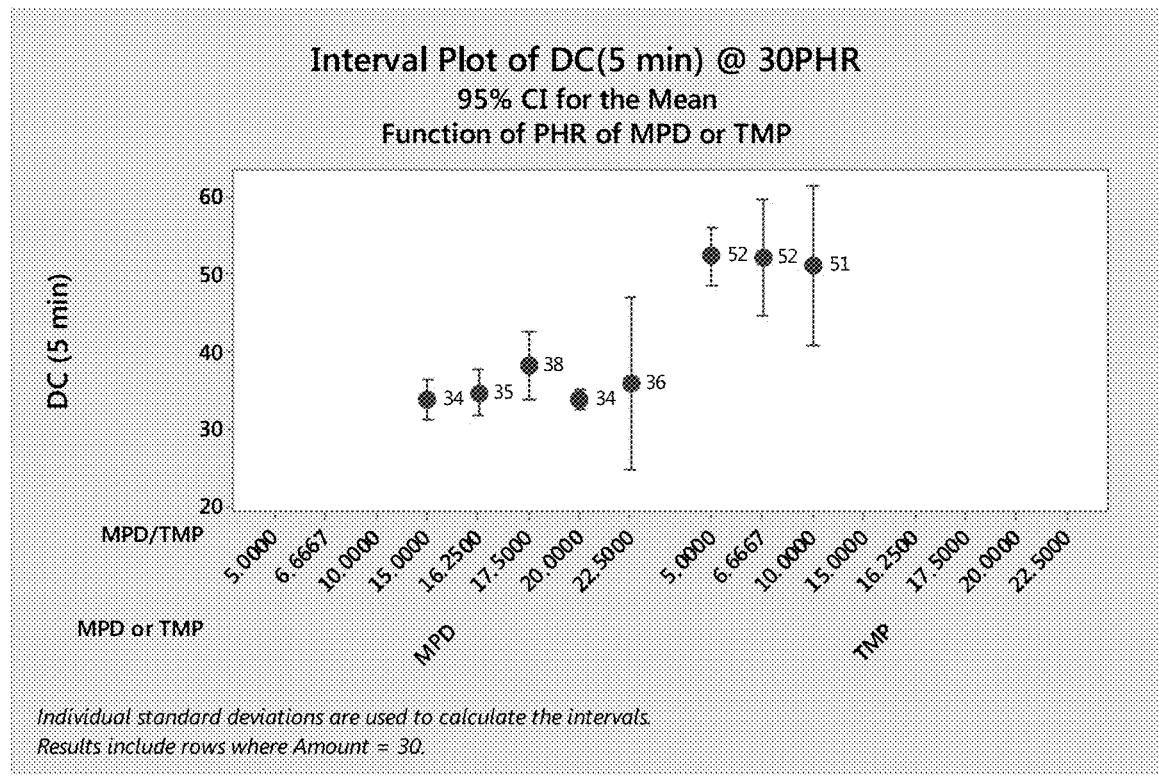
FIG. 13 an interval plot of DC (5 Min) residue as a function of MPD or TMP PHR in the films of Examples 3 and 4.

This reduction in DC (5 min) residue is particularly surprising in light of the DC (5 min) residue results being independent of glycerol, sorbitol, and MPD or TMP levels as shown in FIGS. 11, 12, and 13.

FIG. 11 shows that DC (5 Min) residue is independent of glycerol level for both the MPD and TMP examples.

FIG. 12 shows that DC (5 Min) residue is independent of sorbitol level for both the MPD and TMP examples.

FIG. 13 shows that DC (5 Min) residue is independent of either MPD or TMP level within the MPD and TMP examples, respectively.

Without intending to be bound by any particular theory, it is believed that the observed effect is in part because MPD (mwt. 90) is lower in molecular weight than TMP (mwt. 134). Therefore, it may be more mobile and more readily give water access to the PVOH resin, for dissolution. However, this mobility is not likely the only explanation as then it would be expected that a 50% increase in the MPD would show a significant effect on reduction of DC (5 min) residue. In FIG. 13 comparing DC (5 min) residue of 34% at 15 PHR of MPD to 36% at 22.5 PHR shows that the increase in MPD level alone is not driving the lower DC (5 min) residue values exhibited in the GSM films.

Figure 14:
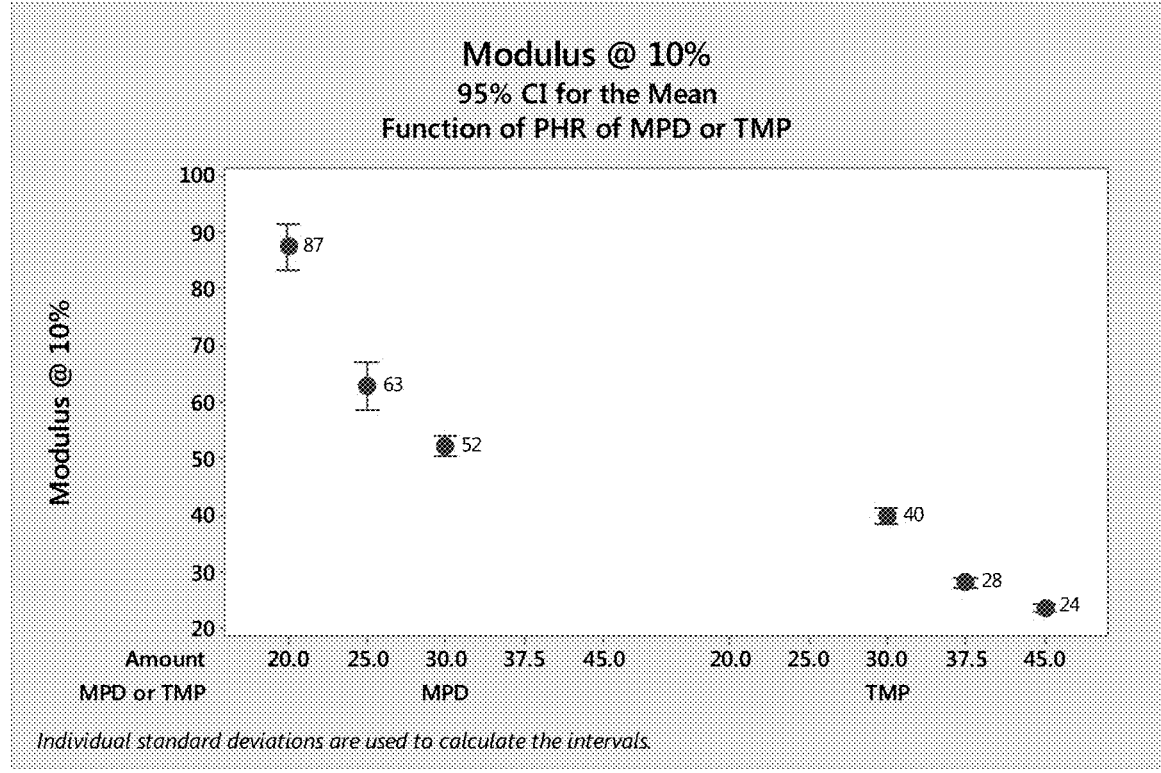
FIG. 14 plots Modulus at 10% as a function of blend total PHR (GSM or GMT) for the films of Examples 3 and 4.

FIG. 14 shows that with regard to the Modulus at 10%, the greater the amount of plasticizer blend added with both MPD or TMP the lower is the Modulus value. This is as would be expected. However, it is notable that at the same loading of 30 PHR the MPD plasticized film has a higher modulus (52) compared to the TMP plasticized film (40). This shows that MPD is less effective, per PHR, in plasticizing the water soluble film. Therefore, the explanation that MPD is a more effective plasticizer in all properties cannot be the explanation for the surprisingly low DC (5 min) residue values exhibited in the GSM films. Therefore, the superior DC (5 min) residue values exhibited by the GSM-type films are particularly surprising.

Example 7

Figure 15:
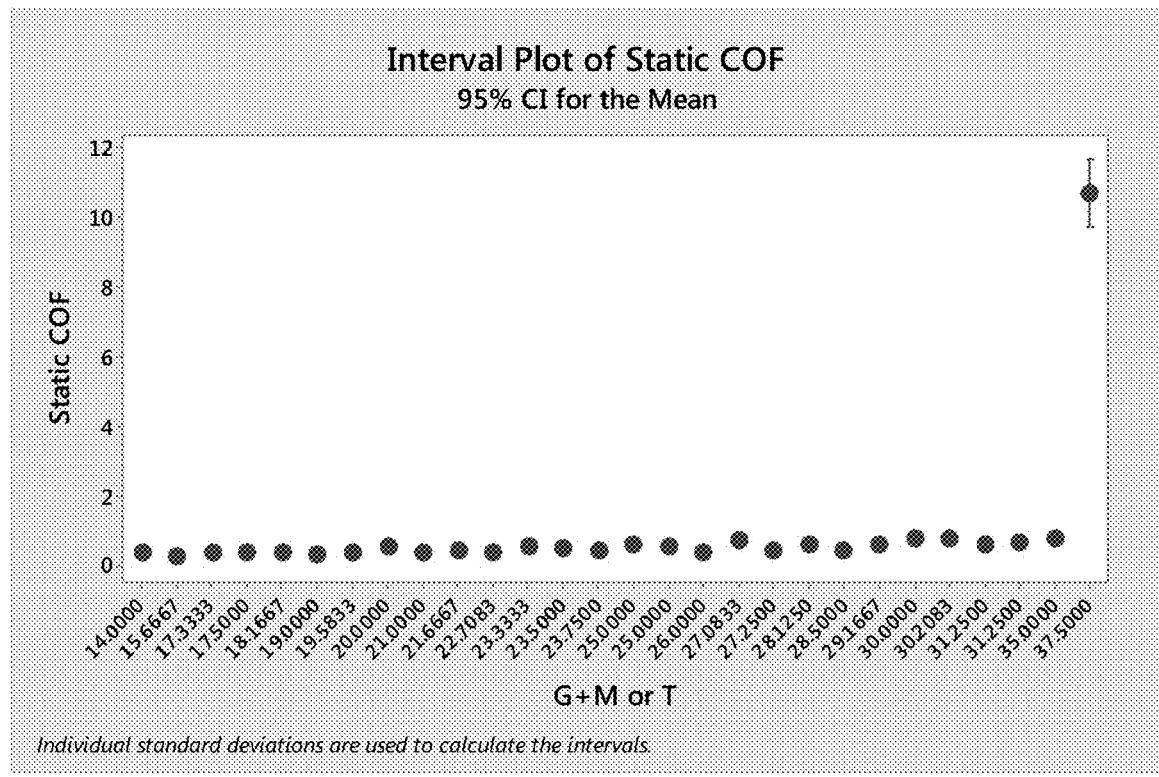
FIG. 15 is an interval plot of Static COF as a function of glycerol plus MPD or TMP level (PHR) for the films of Examples 3 and 4.

The Static COF of the films of Examples 3 and 4 were measured, and it was found that when the total quantity of glycerol plus MPD or TMP is less than 37.5 PHR, or at 35 PHR or less, then the COF was advantageously less than 1. In these films, at a total of 37.5 PHR of glycerol plus MPD or TMP, the Static COF jumped to about 11. See FIG. 15.

Without intending to be bound by any particular theory, it is believed that in both the GSM and GST blends the total level of glycerol plus MPD or TMP is below a critical solubility-like threshold. Therefore particularly when the glycerol+TMP level is greater than about 37.5 PHR the PVOH polymer can no longer hold the glycerol and TMP in "solution" and one or the other of the plasticizers comes to the surface and creates a sticky film, reflected in the increased Static COF.

Figure 16:
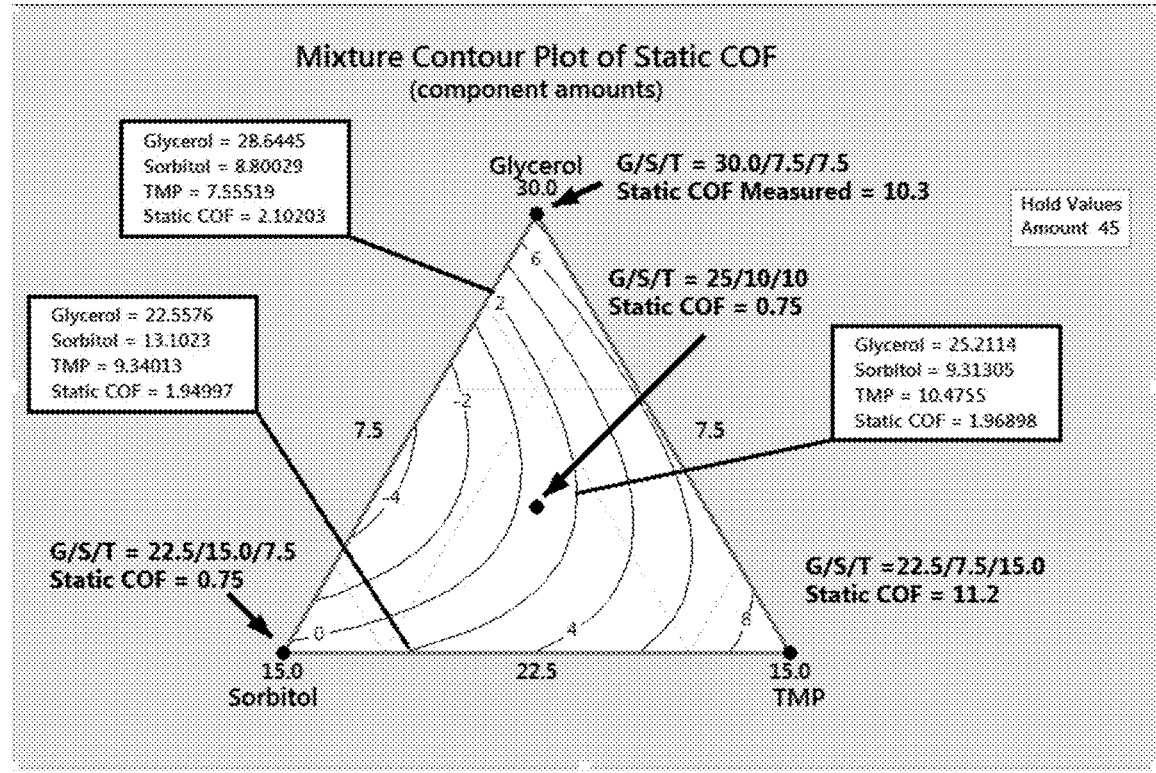
FIG. 16 is a modeled mixture contour plot of Static COF for blends of glycerol, sorbitol, and TMP in films like those of Example 4.

A model was fit to the data, and FIG. 16 shows a space at 45 total PHR (GST blend) that would provide a Static COF of less than about 1, in the system having 0.7 PHR antiblock filler (e.g., SiO$_2$) and 0.7 PHR release modifier (e.g., stearic acid).

The foregoing description is given for clearness of understanding only, and no unnecessary limitations should be understood therefrom, as modifications within the scope of the invention may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

What is claimed is:

1. A water-soluble film comprising a mixture of a water-soluble polyvinyl alcohol and a plasticizer blend comprising glycerol, sorbitol, and 2-methyl-1,3-propanediol, wherein
   (i) the plasticizer blend is present in an amount in a range of 25 PHR to about 30 PHR; or
   (ii) the plasticizer blend is present in an amount of at least 25 PHR and the individual components are 6.0PHR<glycerol<13.5PHR;

1.0PHR<sorbitol<5.0PHR; and 10.0PHR<2-methyl-1,3-propanediol<15.0PHR, wherein the water-soluble polyvinyl alcohol comprises an anionic group modified polyvinyl alcohol, and the mixture further comprises propylene glycol, a modified starch filler, an antioxidant, a surfactant, a defoamer, a $SiO_2$ anti-block filler, and a stearic acid release modifier.

2. The water-soluble film of claim 1, wherein the water-soluble polyvinyl alcohol comprises a monomethyl maleate co-polymer.

3. The water-soluble film of claim 1, wherein the rate of anionic group modification is in a range of 1 to 10 mole %.

4. The water-soluble film of claim 1, wherein (ii) the plasticizer blend is present in an amount of at least 25 PHR and the individual components are 6.0PHR<glycerol<13.5PHR;

1.0PHR<sorbitol<5.0PHR; and 10.0PHR<2-methyl-1,3-propanediol<15.0PHR, and further wherein the plasticizer blend is present in an amount up to about 40 wt %.

5. The water-soluble film of claim 1, wherein (i) the plasticizer blend is present in an amount in a range of 25 PHR to about 30 PHR and the individual components are 5.0PHR<glycerol<11.3PHR;

1.25PHR<sorbitol<7.5PHR; and 12.5PHR<2-methyl-1,3-propanediol<18.8PHR.

6. The water-soluble film of claim 1, wherein (i) the plasticizer blend is present in an amount of about 30 PHR and the individual components are 6.0PHR<glycerol<13.5PHR;

1.5PHR<sorbitol<9.0PHR; and

15PHR<2-methyl-1,3-propanediol<22.5PHR.

7. The water-soluble film of claim 6, wherein (i) the plasticizer blend is present in an amount of about 30 PHR and the individual components are 7.6PHR<glycerol<11.8PHR;

2.2PHR<sorbitol<7.3PHR; and

15PHR<2-methyl-1,3-propanediol<18.5PHR.

8. The water-soluble film of claim 1, wherein the polyvinyl alcohol is a maleate polyvinyl alcohol copolymer having a carboxyl pendant group modification degree in a range of 6 mol % to 10 mol %, and a viscosity in a range of 10.5 cP to 22.5 cP, and a degree of hydrolysis in a range of about 80% to 99%.

9. The water-soluble film of claim 1, wherein the polyvinyl alcohol is a methyl acrylate polyvinyl alcohol copolymer having a degree of modification of about 4.0 mol % to about 6.0 mol %, and a viscosity of about 10 cP to 30 cP, and a degree of hydrolysis of about 98.0% to about 99.8%.

10. The water-soluble film of claim 1, wherein the $SiO_2$ anti-block filler is an untreated synthetic amorphous silica.

11. The water-soluble film of claim 10, wherein the $SiO_2$ anti-block filler has a median particle size in a range of about 3 to about 11 microns.

12. The water-soluble film of claim 1, wherein the mixture further comprises another release modifier selected from the group consisting of fatty acids other than stearic acid, fatty acid esters, fatty acid amides, linear or branched versions of any of the foregoing, saturated or unsaturated versions of any of the foregoing, substituted or unsubstituted versions of any of the foregoing and mixtures thereof.

13. The water-soluble film of claim 12, wherein the other release modifier is a fatty acid other than stearic acid.

14. The water-soluble film of claim 1, wherein the release modifier has a melting point of about 90° C. or less.

15. The water-soluble film of claim 14, wherein the release modifier has a melting point of about 40° C. or greater.

16. The water-soluble film of claim 1, wherein the $SiO_2$ anti-block filler and release modifier are present at a ratio in a range of 1:3 to 3:1.

17. The water-soluble film of claim 1, wherein the $SiO_2$ anti-block filler is present in an amount of at least 0.1 PHR.

18. The water-soluble film of claim 1, wherein the release modifier is present in an amount of at least 0.1 PHR.

19. The water-soluble film of claim 1, wherein the $SiO_2$ anti-block filler and release modifier are collectively present in an amount of less than 4 PHR.

20. The water-soluble film of claim 1, wherein the film has a static coefficient of friction of 4 or less.

21. The water-soluble film of claim 1, wherein the film has a tear strength of at least 1000 g/mil.

22. A container comprising the film of claim 1.

23. The container of claim 22 further comprising a liquid detergent therein, wherein the container, when immersed into bulk water at 20° C., does not release the liquid detergent for at least 30 seconds.

24. A water-soluble film comprising a mixture of a water-soluble polyvinyl alcohol and a plasticizer blend comprising glycerol, sorbitol, and trimethylolpropane, wherein the plasticizer blend is present in an amount of about 37.5 PHR to 45 PHR;
   wherein the water-soluble polyvinyl alcohol comprises an anionic group modified polyvinyl alcohol, and the mixture further comprises propylene glycol, a modified starch filler, an antioxidant, a surfactant, a defoamer, a $SiO_2$ anti-block filler, and a stearic acid release modifier.

* * * * *